(12) United States Patent
Shimotsuma et al.

(10) Patent No.: US 10,823,574 B2
(45) Date of Patent: Nov. 3, 2020

(54) COMMUNICATION METHOD, ROADSIDE UNIT, AND COMMUNICATION SYSTEM

(71) Applicant: Panasonic Intellectual Property Corporation of America, Torrance, CA (US)

(72) Inventors: Yuta Shimotsuma, Osaka (JP); Kazunobu Konishi, Osaka (JP); Takahiro Yoneda, Osaka (JP); Ryota Ohnishi, Hyogo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 142 days.

(21) Appl. No.: 15/986,169

(22) Filed: May 22, 2018

(65) Prior Publication Data

US 2018/0347992 A1    Dec. 6, 2018

(30) Foreign Application Priority Data

Jun. 1, 2017  (JP) .................................. 2017-109441
Feb. 7, 2018  (JP) .................................. 2018-019970

(51) Int. Cl.
*G01C 21/30* (2006.01)
*G01C 21/36* (2006.01)
(Continued)

(52) U.S. Cl.
CPC ......... *G01C 21/30* (2013.01); *G01C 21/3694* (2013.01); *G06T 11/60* (2013.01);
(Continued)

(58) Field of Classification Search
CPC .... G01C 21/30; G01C 21/3694; G01C 21/00; G01C 21/005; G01C 21/06; G01C 21/10;
(Continued)

(56) References Cited

U.S. PATENT DOCUMENTS

2009/0115638 A1* 5/2009 Shankwitz ........... G08G 1/0104
                                                          340/988
2017/0046958 A1   2/2017 Naka et al.

FOREIGN PATENT DOCUMENTS

JP    2005-011252    1/2005
JP    2010-252137    11/2010

OTHER PUBLICATIONS

The Extended European Search Report dated Nov. 13, 2018 for the related European Patent Application No. 18173979.8.
(Continued)

*Primary Examiner* — Anthony R Jimenez
(74) *Attorney, Agent, or Firm* — Greenblum & Bernstein, P.L.C.

(57) ABSTRACT

A communication method in a roadside unit that acquires first dynamic information indicative of a dynamic object around the roadside unit and second dynamic information indicative of a dynamic object around in-vehicle units includes: selecting at least one in-vehicle unit from among the plurality of in-vehicle units on a basis of a list in which the second dynamic information and the in-vehicle units having the second dynamic information are associated with each other; acquiring the first dynamic information indicative of a state around the roadside unit acquired by a sensor mounted in the roadside unit; configurating a dynamic map on a basis of the acquired first dynamic information, the second dynamic information acquired from the selected in-vehicle unit, and a static map indicative of a static object; and transmitting the dynamic map to one or more of the in-vehicle units that communicate with the roadside unit.

7 Claims, 14 Drawing Sheets

(51) Int. Cl.
    *G06T 11/60* (2006.01)
    *G08G 1/0967* (2006.01)
    *G08G 1/01* (2006.01)

(52) U.S. Cl.
    CPC ..... *G08G 1/0116* (2013.01); *G08G 1/096716* (2013.01); *G08G 1/096783* (2013.01)

(58) Field of Classification Search
    CPC ........ G01C 21/12; G01C 21/14; G01C 21/16; G01C 21/20; G01C 21/26; G01C 21/34; G01C 21/3415; G01C 21/3492; G01C 21/3446; G01C 21/36; G01C 21/3691; G08G 1/0116; G08G 1/096716; G08G 1/096783; G08G 1/00; G08G 1/096741; G08G 1/09675; G08G 1/00785; G08G 1/0104; G08G 1/0012; G08G 1/0114; G08G 1/0129; G08G 1/0137; G08G 1/0141; G08G 1/056; G08G 1/017; G08G 1/0123; G08G 1/09; G08G 1/16; G08G 1/04; G08G 1/0145; G08G 1/0967; G08G 1/01; G06T 11/60; H04B 7/088; H04B 7/0695; H04W 84/00; G01S 2205/00; G01S 2205/001; G01S 5/00; G01S 5/0009; G01S 5/0018; G01S 5/0027; G01S 5/0045; G01S 5/0054; G01S 5/0063; G01S 5/009; G01S 5/015; G01S 19/00; G01S 19/01; G01S 19/06; G01S 2201/02; G01S 1/00; G01S 1/02; B60W 20/00; B60W 20/12; B60W 30/00; B60W 30/02; B60W 30/10; B60W 30/12; B60W 30/14; G01P 13/00; G06F 5/30598; G06F 5/17381
    USPC .......................................................... 701/451
    See application file for complete search history.

(56) References Cited

OTHER PUBLICATIONS

Shooter C et al: "INTERSAFE-2 Architecture and Specification", Intelligent Computer Communication and Processing, 2009. ICCP 2009. IEEE 5th International Conference on, IEEE, Piscataway, NJ, USA, Aug. 27, 2009 (Aug. 27, 2009), pp. 379-386, XP031545074.

* cited by examiner

| OBJECT IDENTIFIER | TIME STAMP [msec] | POSITION [m] | SPEED [m/s] | TRAVELLING DIRECTION [dec] |
|---|---|---|---|---|
| Object 1 | t1 | (x, y, z) | a | b |

| OBJECT IDENTIFIER |
|---|
| Object 1 |

| INFORMATION RELEVANT TO REQUEST DESTINATION VEHICLE | | | INFORMATION RELEVANT TO REQUESTED OBJECT | | |
|---|---|---|---|---|---|
| OBJECT IDENTIFIER | TIME STAMP [msec] | POSITION [m] | OBJECT IDENTIFIER | TIME STAMP [msec] | POSITION [m] |
| Object 1 | t1 | (x1, y1, z1) | Object 2 | t2 | (x2, y2, z2) |

| OBJECT IDENTIFIER | INFORMATION ON TRANSMISSION SOURCE | | | | | SECOND OBJECT INFORMATION | | | | |
|---|---|---|---|---|---|---|---|---|---|---|
| | TIME STAMP [msec] | POSITION [m] | SPEED [m/s] | TRAVELLING DIRECTION [dec] | | OBJECT IDENTIFIER | TIME STAMP [msec] | POSITION [m] | SPEED [m/s] | TRAVELLING DIRECTION [dec] |
| Object 1 | t1 | (x1, y1, z1) | a1 | b1 | | Object 2 | t2 | (x2, y2, z2) | a2 | b2 |

| AREA IDENTIFIER | GROUP OF VERTEXES OF AREA |
|---|---|
| Area 1 | [(x1, y1, z1),...] |

COMMUNICATION METHOD, ROADSIDE UNIT, AND COMMUNICATION SYSTEM

BACKGROUND

1. Technical Field

The present disclosure relates to a communication method, a roadside unit, and a communication system. In particular, the present disclosure relates to a method for communication between a roadside unit and a vehicle, a roadside unit that configurates a dynamic map by using sensor information and distributes the dynamic map, and a communication system.

2. Description of the Related Art

In recent years, development of technologies for safe driving assistance and automated driving is progressing. Under such a circumstance, a method for allowing a driver and a vehicle to grasp dynamic information such as positions of vehicle, pedestrian, bicycle, and the like around the vehicle and a state of a traffic signal by using a dynamic map.

A dynamic map is a map obtained by superimposing dynamic information such as positions and speeds of objects that change with passage of time onto a static map on which positions and the like of objects do not change over time. More specifically, a dynamic map is a map obtained by superimposing static information such as buildings and roads onto a static map of map data and then superimposing dynamic information such as positions and speeds of surrounding vehicles, pedestrians, and the like acquired by sensors mounted on a vehicle and a roadside unit onto the static map.

A vehicle can assist driver's safe driving by visualizing, for a driver, information on surroundings based on a dynamic map. Furthermore, use of the dynamic map allows the vehicle to accurately grasp a surrounding situation that changes from moment to moment because of movement of the vehicle and movement of surrounding vehicle and bicycle.

Furthermore, use of a dynamic map allows a vehicle to recognize a surrounding situation in a range that cannot be recognized by a sensor mounted on the vehicle. For example, the vehicle can grasp positions of vehicle, pedestrian, and the like beforehand when the vehicle enters a place with poor visibility such as an intersection. This allows the vehicle to perform control for safety such as speed adjustment and steering well in advance in accordance with a surrounding situation, leading to a reduction in the number of traffic accidents and to efficient traffic.

Various methods have been proposed as methods for collecting and distributing dynamic information necessary for creation of a dynamic map (see, for example, Japanese Patent No. 5316193 and Japanese Patent No. 4247710). Japanese Patent No. 5316193 proposes a method for controlling communication between a vehicle and a roadside unit. Japanese Patent No. 4247710 discloses a vehicle-use information offering device that receives oncoming-vehicle information from an infrastructure control device and offers the oncoming-vehicle information to a driver when a vehicle turns right at an intersection. The vehicle-use information offering device recognizes the presence of an oncoming vehicle that cannot be visually recognized by the driver and notifies the driver about the presence of the oncoming vehicle that cannot be visually recognized by the driver in a case where such an oncoming vehicle exists.

SUMMARY

In Japanese Patent No. 5316193, communication from the roadside unit to the vehicle is guaranteed by controlling communication between the roadside unit and the vehicle on the basis of a time slot so that information can be acquired from the vehicle by the roadside unit. However, in a case where the roadside unit collects information from a plurality of vehicles by using a network band, which is limited, there is a possibility that the roadside unit collects information of a certain vehicle redundantly and fails to acquire necessary information, for example, information on surrounding pedestrian, vehicle, and the like in a range that cannot be observed by the roadside unit.

Japanese Patent No. 4247710 discloses a configuration for offering oncoming-vehicle information from the infrastructure control device to the vehicle-use information offering device but fails to disclose a configuration for offering information on a pedestrian, a vehicle, and the like in a range that cannot be observed by the infrastructure control device from the vehicle-use information offering device to the infrastructure control device.

One non-limiting and exemplary embodiment provides a communication method, a roadside unit, and a communication system that can make shortage of a network band less likely.

In one general aspect, the techniques disclosed here feature a communication method in a roadside unit that acquires first dynamic information indicative of a dynamic object around the roadside unit and second dynamic information indicative of a dynamic object around in-vehicle units, including: selecting at least one in-vehicle unit from among the plurality of in-vehicle units on a basis of a list in which the second dynamic information and the in-vehicle units having the second dynamic information are associated with each other; acquiring the first dynamic information indicative of a state around the roadside unit acquired by a sensor mounted in the roadside unit; configurating a dynamic map on a basis of the acquired first dynamic information, the second dynamic information acquired from the selected in-vehicle unit, and a static map indicative of a static object; and transmitting the dynamic map to one or more of the in-vehicle units that communicate with the roadside unit.

According to the present disclosure, it is possible to make shortage of a network band less likely.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
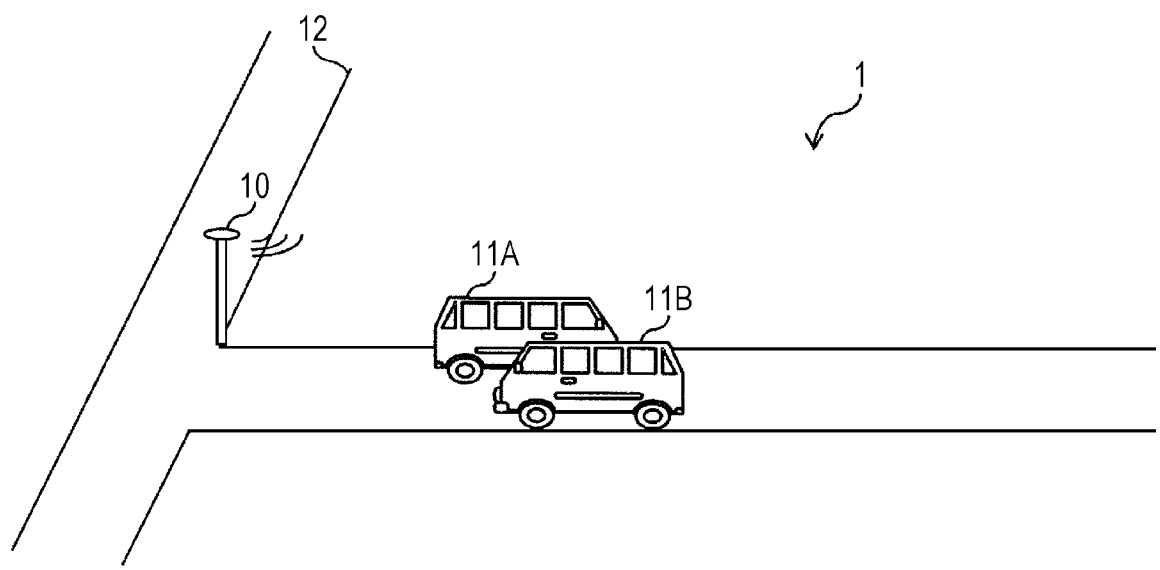
FIG. 1 is a schematic view illustrating an example of a configuration of a communication system according to Embodiment 1.

A communication method according to an aspect of the present disclosure is a communication method in a roadside unit that acquires first dynamic information indicative of a dynamic object around the roadside unit and second dynamic information indicative of a dynamic object around in-vehicle units, including: selecting at least one in-vehicle unit from among the plurality of in-vehicle units on a basis of a list in which the second dynamic information and the in-vehicle units having the second dynamic information are associated with each other; acquiring the first dynamic information indicative of a state around the roadside unit acquired by a sensor mounted in the roadside unit; configurating a dynamic map on a basis of the acquired first dynamic information, the second dynamic information acquired from the selected in-vehicle unit, and a static map indicative of a static object; and transmitting the dynamic map to one or more of the in-vehicle units that communicate with the roadside unit.

In the selecting, at least one in-vehicle unit is selected from among a plurality of in-vehicle units on the basis of a list in which second dynamic information and in-vehicle units that have the second dynamic information are associated with each other. In the configurating, a dynamic map is configured on the basis of first dynamic information acquired in the acquiring, second dynamic information acquired from the selected in-vehicle unit, and a static map indicative of a static object. In the transmitting, the configurated dynamic map is transmitted to one or more of the in-vehicle units. In this way, the roadside unit can acquire second dynamic information that cannot be observed by the roadside unit while avoiding reception of duplicate second dynamic information, and the in-vehicle units can use a dynamic map thus configurated.

Furthermore, since the roadside unit selects an in-vehicle unit so that the number of in-vehicle units that transmit second dynamic information to the roadside unit becomes small, a communication period in the whole in-vehicle units can be shortened. This allows the roadside unit to efficiently collect second dynamic information necessary for creation of a dynamic map from the in-vehicle units. This can make shortage of a network band between the roadside unit and the in-vehicle units less likely.

It is therefore possible to efficiently collect data necessary for creation of a dynamic map and make shortage of a network band less likely.

In particular, since data necessary for creation of a dynamic map is efficiently collected, failure of upload of information from the in-vehicle units to the roadside unit because of shortage of a network band between the in-vehicle units can be made less likely. This achieves stable communication.

A roadside unit according to an aspect of the present disclosure is a roadside unit installed on a road, including: a sensor that acquires sensing data indicative of a state around the roadside unit; a communication circuit; and circuitry that, in operation, performs operation including: configurating a dynamic map by superimposing first dynamic information on the road based on the sensing data onto a static map including the road, transmitting, through the communication circuit, the dynamic map to a plurality of in-vehicle units that are capable of communicating with the roadside unit, receiving, through the communication circuit, second dynamic information that is not included in the dynamic map from each of the plurality of in-vehicle units, selecting at least one in-vehicle unit from among the plurality of in-vehicle units on a basis of a list in which the received second dynamic information and the in-vehicle units that have transmitted the second dynamic information are associated with each other, and requesting the at least one in-vehicle unit to transmit the second dynamic information to the roadside unit.

A communication system according to an aspect of the present disclosure includes a roadside unit and in-vehicle units that transmit second dynamic information to the roadside unit and are mounted in a plurality of vehicles.

The roadside unit and the communication system also produce the aforementioned effects.

The communication method according to the aspect of the present disclosure further includes requesting the selected in-vehicle unit to transmit the second dynamic information to the roadside unit; and wherein in the configurating, the dynamic map is configured on a basis of the acquired first dynamic information, second dynamic information acquired from the selected in-vehicle unit and indicating a dynamic object that is not included in the dynamic map, and the static map.

According to this method, in the configurating, a dynamic map is configured on the basis of first dynamic information acquired in the acquiring, second dynamic information that is acquired from the in-vehicle unit selected in the selecting and indicates a dynamic object that is not included in a dynamic map, and a static map. The roadside unit acquires second dynamic information including a surrounding situation that is hard to observe by the roadside unit and therefore can superimpose the second dynamic information that is not included in the dynamic map onto the dynamic map. The in-vehicle units can more accurately grasp a surrounding situation by using the dynamic map thus configured.

The communication method according to the aspect of the present disclosure includes receiving the second dynamic information from each of one or more of the in-vehicle units.

According to this method, in the receiving, the roadside unit receives second object information from each of one or more of the in-vehicle units. Since second object information can be acquired from an in-vehicle unit selected in the selecting, it is unnecessary to acquire second object information from all of the in-vehicle units. This can make shortage of a network band between the roadside unit and the in-vehicle units less likely.

In the communication method according to the aspect of the present disclosure, the selecting further includes: selecting a first in-vehicle unit that has transmitted a largest number of pieces of second dynamic information from among the plurality of in-vehicle units included in the list; excluding the first in-vehicle unit from the list; selecting a second in-vehicle unit that has transmitted second dynamic information identical to the second dynamic information transmitted by the first in-vehicle unit; and updating the list by excluding the second in-vehicle unit from the list.

According to this method, the first in-vehicle unit among the plurality of in-vehicle units included in the list is excluded from the list. Furthermore, the second in-vehicle unit is excluded from the list, and then the list is updated. Since the first in-vehicle unit and the second in-vehicle unit are excluded from the list, it is possible to decrease the number of in-vehicle units to be selected. Since the number of in-vehicle units that communicate with the roadside unit decreases, it is possible to decrease an amount of communication between the roadside unit and the in-vehicle units.

The communication method according to the aspect of the present disclosure further includes receiving second dynamic information which is present within a predetermined area, the predetermined area being set on the static map in advance.

According to this method, second dynamic information that is present within a predetermined area set in advance on a static map is received in the receiving. By setting in advance a predetermined area in which second dynamic information is needed, it becomes unnecessary to receive second dynamic information in an unnecessary area. That is, the roadside unit can keep an amount of communication of second dynamic information received from the in-vehicle units small since the predetermined area in which second dynamic information is needed is limited. Since the number of in-vehicle units that communicate with the roadside unit decreases, it is possible to decrease an amount of communication between the roadside unit and the in-vehicle units. It is therefore possible to efficiently collect data necessary for creation a dynamic map and make shortage of a network band less likely.

In this way, the roadside unit can achieve stable communication while making shortage of a network resource less likely and acquire second dynamic information needed by the roadside unit with certainty.

The present disclosure may be realized as an apparatus, may be realized as an integrated circuit including a processor of such an apparatus, may be realized as a method using the processor that constitute the apparatus as steps, may be realized as a program that causes a computer to execute the steps, or may be realized as information, data, or a signal indicative of the program. The program information, data, and signal may be distributed over a recording medium such as a CD-ROM or a communication medium such as the Internet.

Embodiments of the present disclosure are described with reference to the drawings. Each of the embodiments described below is a preferable specific example of the present disclosure. Numerical values, shapes, materials, constituent elements, the way in which the constituent elements are disposed and connected, steps, the order of steps, and the like are examples and do not limit the present disclosure. Among constituent elements in the embodiments below, constituent elements that are not described in independent claims indicating highest concepts are described as optional constituent elements that constitute a more preferable aspect.

Embodiment 1

Configuration of Communication System

FIG. 1 is a schematic view illustrating an example of a configuration of a communication system 1 according to Embodiment 1.

The communication system 1 illustrated in FIG. 1 includes a roadside unit 10, an in-vehicle unit 11A, and an in-vehicle unit 11B. Hereinafter, the in-vehicle unit 11A and the in-vehicle unit 11B, which have an identical configuration, are sometimes referred collectively as in-vehicle units 11. In FIG. 1, two in-vehicle units 11 are illustrated, but more than two in-vehicle units 11 may be present.

Each of the in-vehicle units 11 is mounted in a vehicle running on a road 12. The in-vehicle unit 11 is connected to the roadside unit 10 through wireless communication such as a wireless local area network (LAN).

The roadside unit 10 is installed on the road 12 and is connected to each of the in-vehicle units 11 through the wireless LAN. Details of configurations and the like of these constituent elements are described below.

Configuration of In-Vehicle Unit

Figure 2:
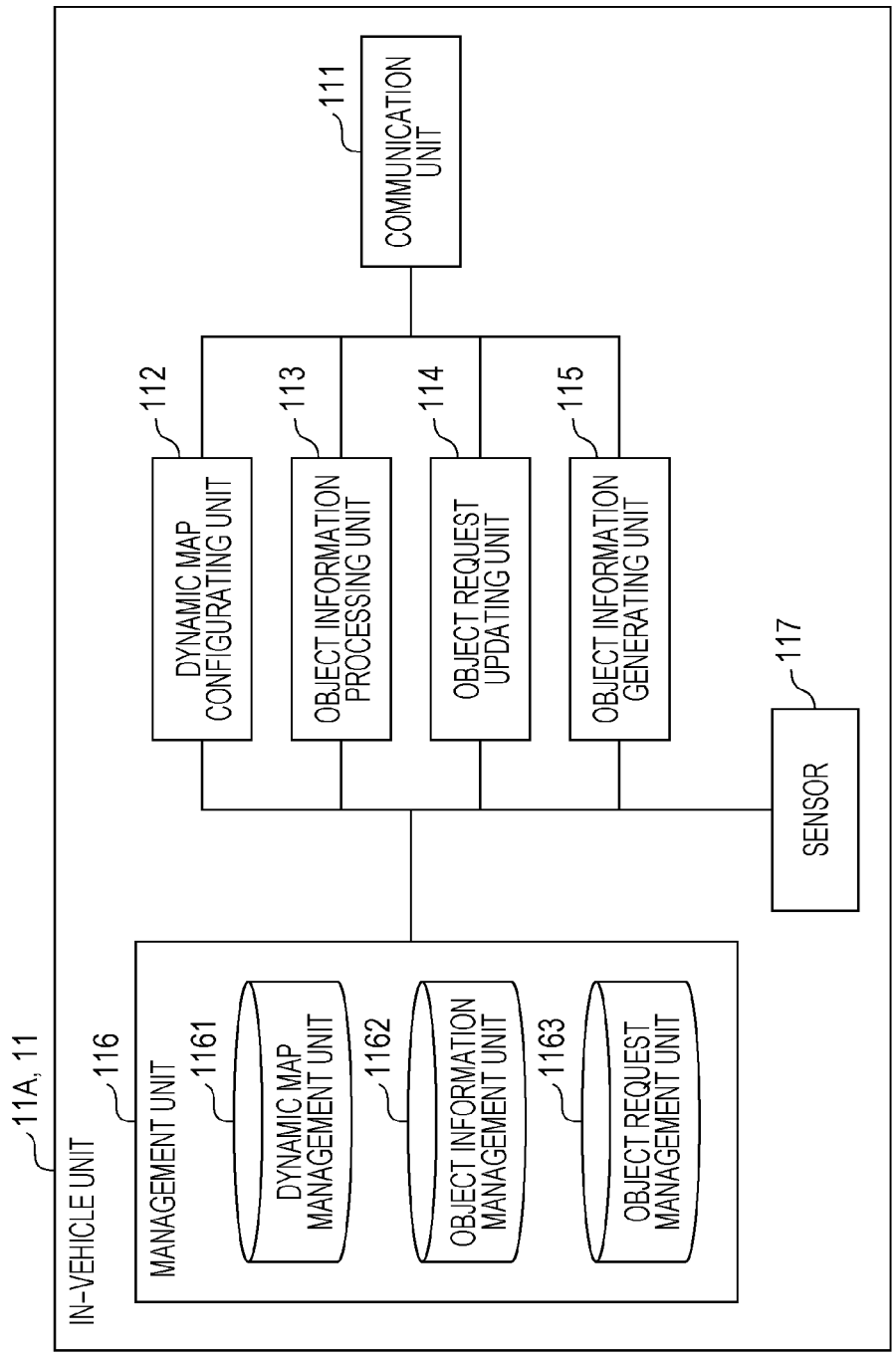
FIG. 2 is a block diagram illustrating an example of a functional configuration of an in-vehicle unit according to Embodiment 1.

FIG. 2 is a block diagram illustrating an example of a functional configuration of each of the in-vehicle units 11 according to Embodiment 1. Each of the in-vehicle units 11 is mounted in a vehicle running on the road 12. The in-vehicle unit 11 illustrated in FIG. 2 includes a communication unit 111, a dynamic map configurating unit 112, an object information processing unit 113, an object request updating unit 114, an object information generating unit 115, a management unit 116, and a sensor 117. The management unit 116 is constituted by a dynamic map management unit 1161, an object information management unit 1162, and an object request management unit 1163.

Communication Unit

The communication unit 111 wirelessly communicates with the roadside unit 10. The communication unit 111 receives a dynamic map, an object request packet, and the like from the roadside unit 10. In the present embodiment, the communication unit 111 communicates with the roadside unit 10 through wireless communication such as a wireless LAN.

Sensor

The sensor 117 acquires sensing data that is dynamic and static information on surroundings of a vehicle such as positions, travelling directions, shapes, and times of a pedestrian and another vehicle. In the present embodiment, the sensor 117 includes a distance measuring sensor such as a laser range finder or a millimeter-wave sensor and acquires, as the sensing data, observed values such as distances to objects around the vehicle and shapes of the objects at predetermined time intervals. The sensor 117 transmits the acquired sensing data to units such as the object information generating unit 115.

The sensor 117 may further include an imaging device such as a camera or a stereo camera. In this case, the sensor 117 further detects a traffic signal and a street sign on the road 12 and acquires information such as positions and colors of the traffic signal and the street sign.

Dynamic Map Configurating Unit

The dynamic map configurating unit 112 reconfigurates, upon receipt of a dynamic map from the roadside unit 10 through the communication unit 111, a dynamic map on the basis of second object information that is dynamic information present around the in-vehicle unit 11 and that is managed in the object information management unit 1162 (described later) and the dynamic map received from the roadside unit 10. That is, the dynamic map configurating unit 112 reconfigures a dynamic map by superimposing, onto the received dynamic map, second object information such as positions and speeds of a vehicle, a pedestrian, and the like around the vehicle acquired by the sensor 117 mounted in the in-vehicle unit 11. Then, the dynamic map configurating unit 112 causes the reconfigured dynamic map to be stored in the dynamic map management unit 1161. The second object information is calculated by the object information generating unit 115 that will be described later. The second object information is an example of second dynamic information.

The dynamic map includes first object information indicative of a dynamic object around the roadside unit 10 and information indicative of static objects that are a road around the roadside unit 10 and installations such as a traffic signal and a street sign installed on the road. The first object information is an example of first dynamic information.

Object Information Generating Unit

The object information generating unit 115 calculates second object information on another vehicle, a pedestrian, and the like present around the in-vehicle unit 11 on the basis of sensing data concerning surroundings of the in-vehicle unit 11 acquired by the sensor 117 and causes the calculated second object information to be stored in the object information management unit 1162. The second object information is information relevant to an object including speed information indicative of a speed of the object, direction information indicative of a travelling direction of the object, positional information indicative of a position of the object, an object identifier used to identify the object. The second object information is mainly information indicative of a dynamic object but may be information indicative of a static object. The positional information includes a current position of the object and a position where the object was present in the past.

Management Unit

The management unit 116 is, for example, a memory such as a RAM or a storage such as a hard disk drive and a solid state drive and is constituted by the dynamic map management unit 1161 that manages a dynamic map, the object information management unit 1162 that manages second object information, and the object request management unit 1163 that manages an object request.

The dynamic map management unit 1161 stores therein a dynamic map when the dynamic map management unit 1161 receives the dynamic map from the dynamic map configurating unit 112.

The object information management unit 1162 stores therein second object information. The second object information is described with reference to FIG. 3.

Figures 3, 4, 5:
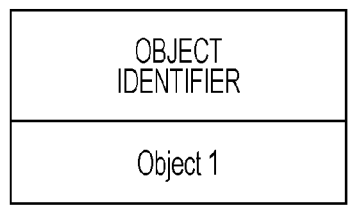
FIG. 3 illustrates an example of object information stored in an object information management unit according to Embodiment 1.
FIG. 4 illustrates an example of an object request stored in an object request management unit according to Embodiment 1.
FIG. 5 illustrates an example of an object request packet according to Embodiment 1.

FIG. 3 illustrates an example of second object information stored in the object information management unit 1162. As illustrated in FIG. 3, the second object information is stored in the object information management unit 1162 so that an object identifier, a time stamp, a position of the object, a speed of the object, and a travelling direction of the object are associated with one another. Although a single kind of second object information is illustrated in FIG. 3, plural kinds of second object information may be present.

The object identifier is used to distinguish among a plurality of objects in the in-vehicle unit 11 and is allocated by the object information generating unit 115. The object identifier may be an identifier unique to an observed object such as a vehicle number or a media access control (MAC) address if any.

The object request management unit 1163 stores therein an object identifier. The object identifier is illustrated in FIG. 4. FIG. 4 illustrates an example of an object request (described later) stored in the object request management unit 1163.

Object Request Updating Unit

The object request updating unit 114 receives an object request packet from the roadside unit 10 through the communication unit 111. The object request packet is used for transmission request by the roadside unit 10 to request the in-vehicle unit 11 that is a request destination to transmit requested second object information needed by the roadside unit 10. The transmission request is, in other words, an object request.

FIG. 5 illustrates an example of the object request packet. As illustrated in FIG. 5, the object request packet includes information relevant to the request destination vehicle and information relevant to the requested object.

The information relevant to the request destination vehicle includes an object identifier, a time stamp, and positional information of the vehicle. The information relevant to the request destination vehicle may include only an object identifier or may include only a time stamp and positional information of the vehicle, provided that the information relevant to the request destination vehicle is information that is used to uniquely select the vehicle from among a plurality of vehicles running on the road. Accordingly, the information relevant to the request destination vehicle may be information indicative of a speed of the vehicle and information indicative of a direction of the vehicle.

The information relevant to the requested object includes an object identifier, a time stamp, and positional information of the object. The information relevant to the requested object may include only an object identifier or may include only a time stamp and positional information of the object. The information relevant to the requested object transmitted by the roadside unit 10 may be any information that is used to uniquely identify an object from among a plurality of objects included in a plurality of pieces of second object information managed in the in-vehicle unit 11.

The object request updating unit 114 checks whether or not the information relevant to the request destination vehicle is information indicative of the in-vehicle unit 11. Specifically, the object request updating unit 114 checks whether or not an object identifier described as the information relevant to the request destination vehicle is information indicative of the in-vehicle unit 11. This intends to make it less likely that an in-vehicle unit 11 mounted in a wrong vehicle different from the request destination vehicle transmits the information relevant to the request destination vehicle to the roadside unit 10 because there are cases where such a vehicle different from the request destination vehicle mistakenly receives the information relevant to the request destination vehicle. In a case where the information relevant to the request destination vehicle is not information indicative of the in-vehicle unit 11, the object request updating unit 114 abandons the object request packet and ends processing performed upon receipt of the object request packet.

In a case where the information relevant to the request destination vehicle is a time stamp and a position of the vehicle, the object request updating unit 114 checks whether or not the position of the in-vehicle unit 11 corresponding to the time stamp matches the position of the vehicle indicated by the information relevant to the request destination vehicle. In this process for checking the positions, there is a possibility that an error exists between positional information managed in the roadside unit 10 and positional information managed in the in-vehicle unit 11. In view of this, in the process for checking the positions, the object request updating unit 114 may determine that the positions match each other in a case where the error is equal to or smaller than a predetermined value. The predetermined value may be set in advance by an administrator of this system or may be statistically calculated by this system. It is assumed that comparison described below takes the error into consideration.

In a case where the information relevant to the request destination vehicle is information indicative of the in-vehicle unit 11, the object request updating unit 114 causes the information relevant to the requested object to be stored in the object request management unit 1163.

Object Information Processing Unit

The object information processing unit 113 acquires second object information corresponding to the object identifier managed in the object request management unit 1163 from the object information management unit 1162 when the object information processing unit 113 receives a dynamic map from the roadside unit 10 through the communication unit 111 and transmits the acquired second object information to the roadside unit 10 through the communication unit 111.

Furthermore, the object information processing unit 113 compares first object information included in the dynamic map received from the roadside unit 10 and the second object information stored in the object information management unit 1162. That is, the object information processing unit 113 checks whether or not the first object information included in the received dynamic map and the second object information stored in the object information management unit 1162 are identical to each other on the basis of information indicative of a time and positional information observed by the sensor 117. In a case where second object information that is not included in the received dynamic map is stored in the object information management unit 1162, the object information processing unit 113 also transmits this second object information to the roadside unit 10.

Hardware Configuration of In-Vehicle Unit

Figure 6:
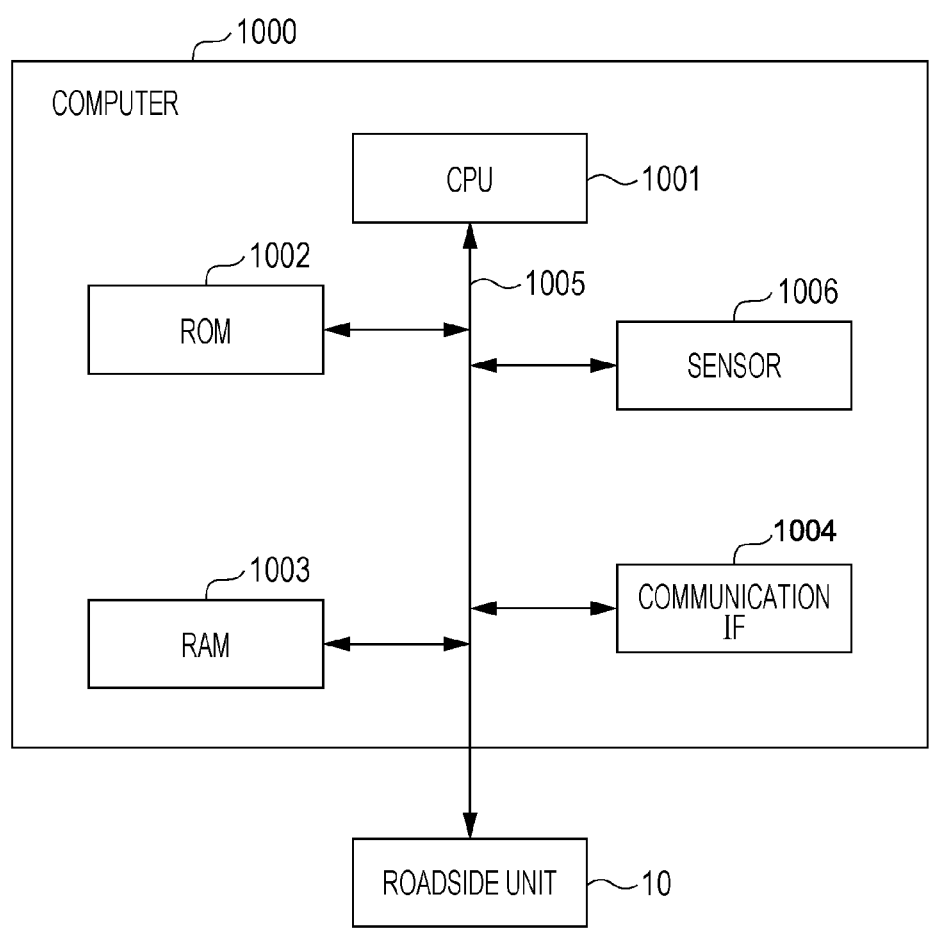
FIG. 6 illustrates an example of a packet of object information distributed from a vehicle to a roadside unit according to Embodiment 1.

FIG. 6 is a diagram illustrating an example of a hardware configuration of the in-vehicle unit 11 according to Embodiment 1.

As illustrated in FIG. 6, the in-vehicle unit 11 is a computer 1000. The computer 1000 includes a central processing unit (CPU) 1001, a read only memory (ROM) 1002, a random access memory (RAM) 1003, a communication interface (IF) 1004, and a sensor 1006. The CPU 1001, the ROM 1002, the RAM 1003, the communication IF 1004, and the sensor 1006 are connected by a communication bus 1005.

The CPU 1001 is a central processing unit that controls, for example, the communication IF 1004 and the sensor 1006 by executing a control program and the like stored in the ROM 1002 and thus performs various processes.

The ROM 1002 is a read-only memory that holds a program and data in advance.

The RAM 1003 is a memory in which data can be written and from which data can be read out and is used for storage of data and the like during execution of a program. The RAM 1003 may be a storage such as a hard disk drive or a solid state drive.

The communication IF 1004 is an interface for wireless communication with the roadside unit 10 and is, for example, a communication circuit.

The sensor 1006 is a sensor such as a laser range finder or a millimeter-wave sensor and is controlled by the CPU 1001. The sensor 1006 may be connected via a universal serial bus (USB) or the communication IF 1004.

Configuration of Roadside Unit

Figure 7:
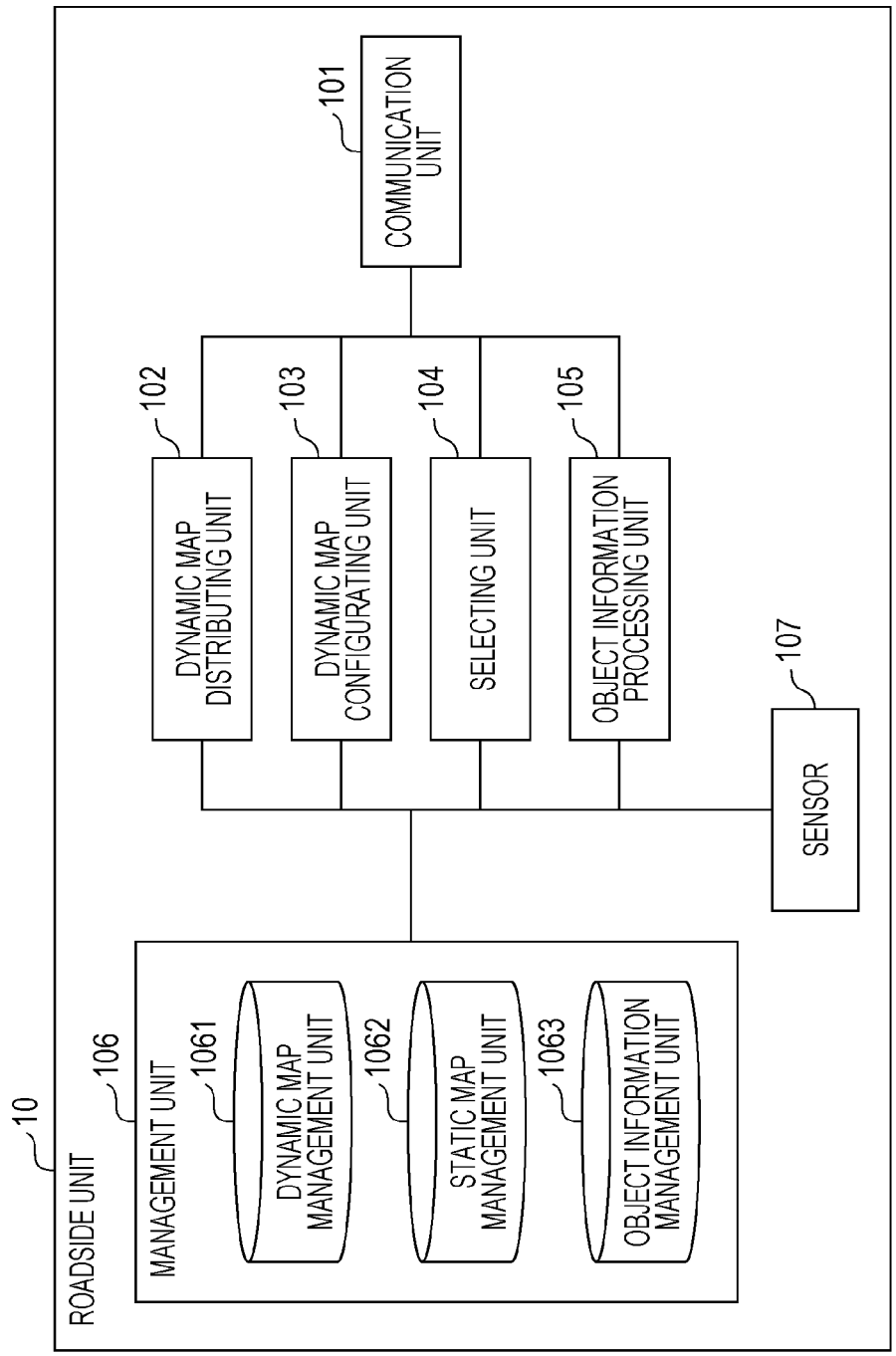
FIG. 7 is a diagram illustrating an example of a hardware configuration of an in-vehicle unit according to Embodiment 1.

FIG. 7 is a diagram illustrating an example of a functional configuration of the roadside unit 10 according to Embodiment 1.

The roadside unit 10 is installed on the road 12. For example, the roadside unit 10 is mounted on a telephone pole, a traffic signal, or the like in the vicinity of the road. The roadside unit 10 illustrated in FIG. 7 includes a communication unit 101, a dynamic map distributing unit 102, a dynamic map configurating unit 103, a selecting unit 104, an object information processing unit 105, a management unit 106, and a sensor 107.

Communication Unit

The communication unit 101 wirelessly communicates with the in-vehicle unit 11 mounted in the vehicle. The communication unit 101 receives, for example, second object information that is not included in a dynamic map from the in-vehicle unit 11. In the present embodiment, the communication unit 101 communicates with the in-vehicle unit 11 mounted in the vehicle through wireless communication such as a wireless LAN.

Sensor

The sensor 107 acquires sensing data that is data of dynamic and static objects present around the roadside unit 10. In the present embodiment, the sensor 107 includes a distance measuring sensor such as a laser range finder or a millimeter-wave sensor and acquires, as information, observed values of distances to objects around the roadside unit 10, shapes of the objects, and the like. The sensor 107 supplies the acquired sensing data to units such as the dynamic map configurating unit 103. The sensor 107 may calculate first object information from the sensing data and supply the calculated first object information to each of the in-vehicle units 11.

The sensor 107 may further include an imaging device such as a camera or a stereo camera. In this case, the sensor 107 further detects a traffic signal and a street sign on the road 12 and acquires, as data, information such as positions and colors of the traffic signal and the street sign.

Management Unit

The management unit 106 is, for example, a memory such as a RAM or a storage such as a hard disk drive or a solid state drive and is constituted by a dynamic map management unit 1061, a static map management unit 1062, and an object information management unit 1063.

The dynamic map management unit 1061 stores therein a dynamic map configured by superimposing first object information on a static map by the dynamic map configurating unit 103.

In the static map management unit 1062, map information indicative of a static map in a preallocated range is stored by an administrator of the roadside unit 10. The map information indicative of a static map stored in the static map management unit 1062 may include information on static objects that are installations on the road, such as position and type of traffic signal and a position of a roadside unit.

The object information management unit 1063 stores therein second object information acquired from the in-vehicle unit 11 by the object information processing unit 105.

Object Information Processing Unit

Figures 8, 9:
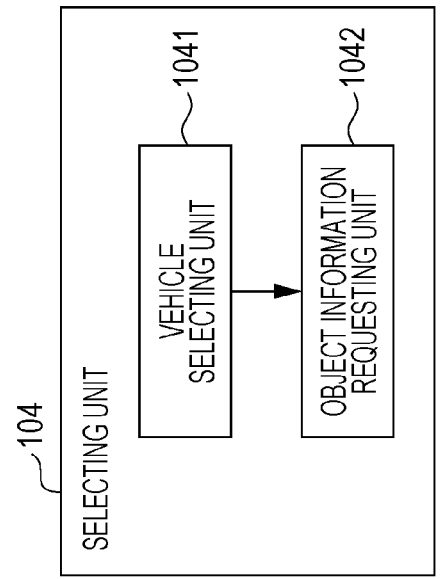
FIG. 8 is a diagram illustrating an example of a functional configuration of a roadside unit according to Embodiment 1.
FIG. 9 is a block diagram illustrating an example of a detailed configuration of a selecting unit.

The object information processing unit 105 receives, from the in-vehicle unit 11 through the communication unit 101, second object information calculated by the in-vehicle unit 11 and transmission source information concerning the in-vehicle unit 11 that has transmitted the second object information. FIG. 8 illustrates an example of a packet received from the in-vehicle unit 11. In FIG. 8, the packet includes second object information and transmission source information concerning the in-vehicle unit 11.

More specifically, the object information processing unit 105 receives, from each of the in-vehicle units 11 mounted in a plurality of vehicles running on the road, second object information calculated by the in-vehicle units 11. The second object information illustrated in FIG. 8 is an object identifier, a time stamp indicative of a time, a position, a speed, and a travelling direction sensed by the in-vehicle unit 11. The transmission source information concerning the in-vehicle unit 11 is an object identifier, a time stamp, a position, a speed, and a travelling direction. The object information processing unit 105 causes the second object information received from the in-vehicle units 11 and the transmission source information concerning the in-vehicle units 11 that have transmitted the second object information to be stored in the object information management unit 1063.

Selecting Unit

The selecting unit 104 selects an in-vehicle unit 11 on the basis of the second object information received from the in-vehicle units 11 through the communication unit 101.

FIG. 9 is a block diagram illustrating an example of a detailed configuration of the selecting unit 104. In FIG. 9, the selecting unit 104 includes a vehicle selecting unit 1041 and an object information requesting unit 1042.

The vehicle selecting unit 1041 creates a selection candidate list by associating the second object information managed in the object information management unit 1063 and information on the in-vehicle units 11 that have transmitted the second object information. The selection candidate list includes second object information concerning objects received from the plurality of in-vehicle units 11 and transmission source information concerning the in-vehicle units 11 that have transmitted the second object information to the roadside unit 10. The second object information includes at least information for specifying an object and includes, for example, an object identifier. The transmission source information includes at least information for selecting a transmission source in-vehicle unit 11 and includes, for example, an object identifier.

The vehicle selecting unit 1041 selects an in-vehicle unit 11 from the selection candidate list so that the number of in-vehicle units 11 that transmit second object information to the roadside unit 10 becomes as small as possible. For example, the vehicle selecting unit 1041 selects in-vehicle units 11 from the selection candidate list, starting from an in-vehicle unit 11 that has transmitted the largest number of objects to the roadside unit 10. The vehicle selecting unit 1041 selects a first in-vehicle unit 11 that has transmitted the largest number of objects to the roadside unit 10 from the selection candidate list. Then, the vehicle selecting unit 1041 excludes, from the selection candidate list, a first in-vehicle unit 11 that has transmitted second object information that is identical to the second object information transmitted by the selected first in-vehicle unit 11. Next, the vehicle selecting unit 1041 selects a second in-vehicle unit 11 that has transmitted the largest number of objects to the roadside unit 10 from the selection candidate list in a manner similar to selection of the first in-vehicle unit 11. The vehicle selecting unit 1041 selects in-vehicle units 11 from which second object information is to be received by repeating the above processes until the selection candidate list becomes empty.

Figure 10:
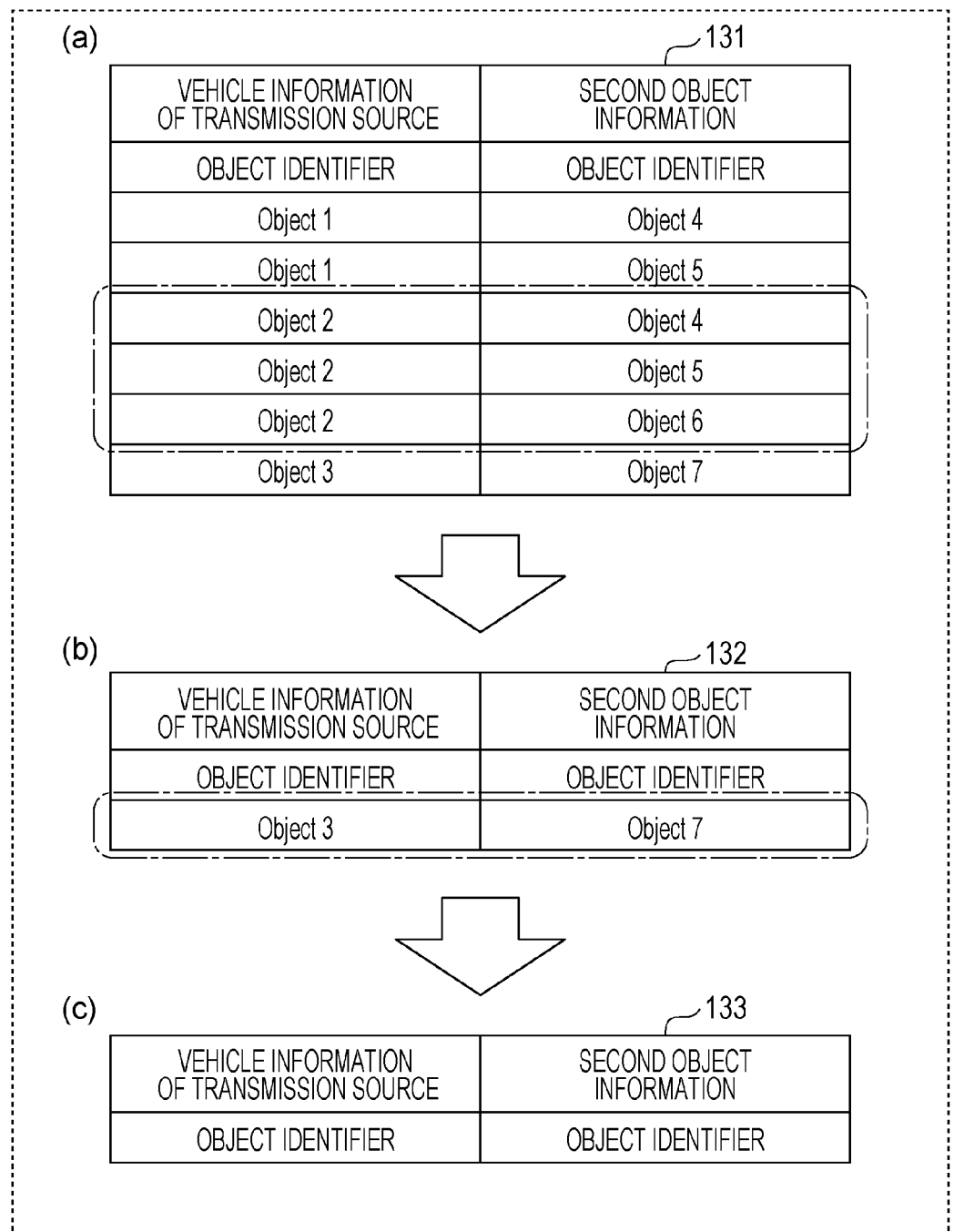
FIG. 10 is an explanatory view illustrating an example of a method of selection performed by a vehicle selecting unit by using a selection candidate list.

The selection method is described with reference to FIG. 10. FIG. 10 is an explanatory view illustrating an example of a method of selection performed by the vehicle selecting unit 1041 by using the selection candidate list.

In FIG. 10(a), it is assumed that the selection candidate list 131 includes three in-vehicle units 11 that have transmitted second object information to the roadside unit 10. Object identifiers of the three in-vehicle units 11 are "object 1", "object 2", and "object 3". Among the three in-vehicle units 11, an in-vehicle unit 11 given "object 2", which has transmitted three pieces of second object information, is an in-vehicle unit 11 that has transmitted the largest number of pieces of second object information. Accordingly, the vehicle selecting unit 1041 selects, as the first in-vehicle unit 11, object identifiers "object 4", "object 5", and "object 6" of second object information that correspond to the object identifier "object 2" that is transmission source vehicle information from the selection candidate list 131. The selected first in-vehicle unit 11 is an example of first selection. Then, the vehicle selecting unit 1041 deletes, from the selection candidate list 131, the object identifier "object 2" and the object identifiers "object 4", "object 5", and "object 6" that correspond to the object identifier "object 2". The object identifiers "object 4" and "object 5" that correspond to the object identifier "object 1" of the in-vehicle unit 11 that is transmission source vehicle information are identical to the object identifiers "object 4" and "object 5" that correspond to the object identifier "object 2" that is transmission source vehicle information. Accordingly, the object identifiers "object 4" and "object 5" that correspond to the object identifier "object 1" of the in-vehicle unit 11 that is transmission source vehicle information are further deleted from the selection candidate list 131. By deleting these object identifiers from the selection candidate list 131, the vehicle selecting unit 1041 creates an updated selection candidate list 132 as illustrated in FIG. 10(b).

Next, when the vehicle selecting unit 1041 creates the updated selection candidate list 132, the object information requesting unit 1042 transmits an object request packet to the in-vehicle unit 11 selected from the updated selection candidate list 132 through the communication unit 101.

Next, the vehicle selecting unit 1041 receives second object information from the in-vehicle unit 11 selected from the updated selection candidate list 132. That is, the vehicle selecting unit 1041 selects, as a second in-vehicle unit 11, an object identifier "object 7" that corresponds to the object identifier "object 3" since an in-vehicle unit 11 that has transmitted the largest number of pieces of second object information in the selection candidate list 132 is an in-vehicle unit 11 given the object identifier "object 3" that is transmission source vehicle information. The selected second in-vehicle unit 11 is an example of second selection. Then, the vehicle selecting unit 1041 deletes, from the selection candidate list 132, the object identifier "object 3" and the object identifier "object 7" that is second object information corresponding to the object identifier "object 3". By deleting these object identifiers from the selection candidate list 132, the vehicle selecting unit 1041 creates an updated selection candidate list 133 as illustrated in FIG. 10(c). The vehicle selecting unit 1041 finishes selection since the selection candidate list 133 is empty.

The vehicle selecting unit 1041 may create a plurality of combinations of in-vehicle units 11 from a selection candidate list and select a combination so that the number of in-vehicle units 11 that transmit second object information to the roadside unit 10 becomes small. Then, the object information requesting unit 1042 may transmit an object request packet to all in-vehicle units 11 selected by the vehicle selecting unit 1041 through the communication unit 101.

Dynamic Map Configurating Unit

As illustrated in FIG. 7, the dynamic map configurating unit 103 calculates first object information concerning a vehicle, a pedestrian, and the like around the roadside unit 10 on the basis of information on a state of surroundings of the roadside unit 10 acquired by the sensor 107. The dynamic map configurating unit 103 configurates a dynamic map by superimposing the first object information and the second object information that are dynamic information on a road onto a static map including the road on the basis of the calculated first object information and the second object information managed in the object information management unit 1063.

In the present embodiment, the dynamic map configurating unit 103 calculates first object information from sensing data acquired from the sensor 107 when the dynamic map configurating unit 103 acquires the sensing data from the sensor 107. Then, the dynamic map configurating unit 103 configurates a dynamic map by associating the calculated first object information, the second object information acquired from the object information management unit 1063, and the static map acquired from the static map management unit 1062.

Then, the dynamic map configurating unit 103 causes the configurated dynamic map to be stored in the dynamic map management unit 1061.

Dynamic Map Distributing Unit

The dynamic map distributing unit 102 distributes a dynamic map stored in the dynamic map management unit 1061 to the in-vehicle units 11. More specifically, the dynamic map distributing unit 102 distributes the dynamic map configurated by the dynamic map configurating unit 103 to a plurality of in-vehicle units 11 that communicates with the roadside unit 10 through the communication unit 101. The distributed dynamic map may include only object information (first object information and second object information) that does not include a static map.

As the hardware configuration of the roadside unit 10 according to Embodiment 1, the computer 1000 illustrated in FIG. 6 can be used for example, as in the case of the in-vehicle unit 11. Details of the computer 1000 have been described above, and description thereof is omitted.

Operation of Whole Communication System

Next, an operation of the communication system 1 configured as above is described with reference to FIG. 11.

Figure 11:
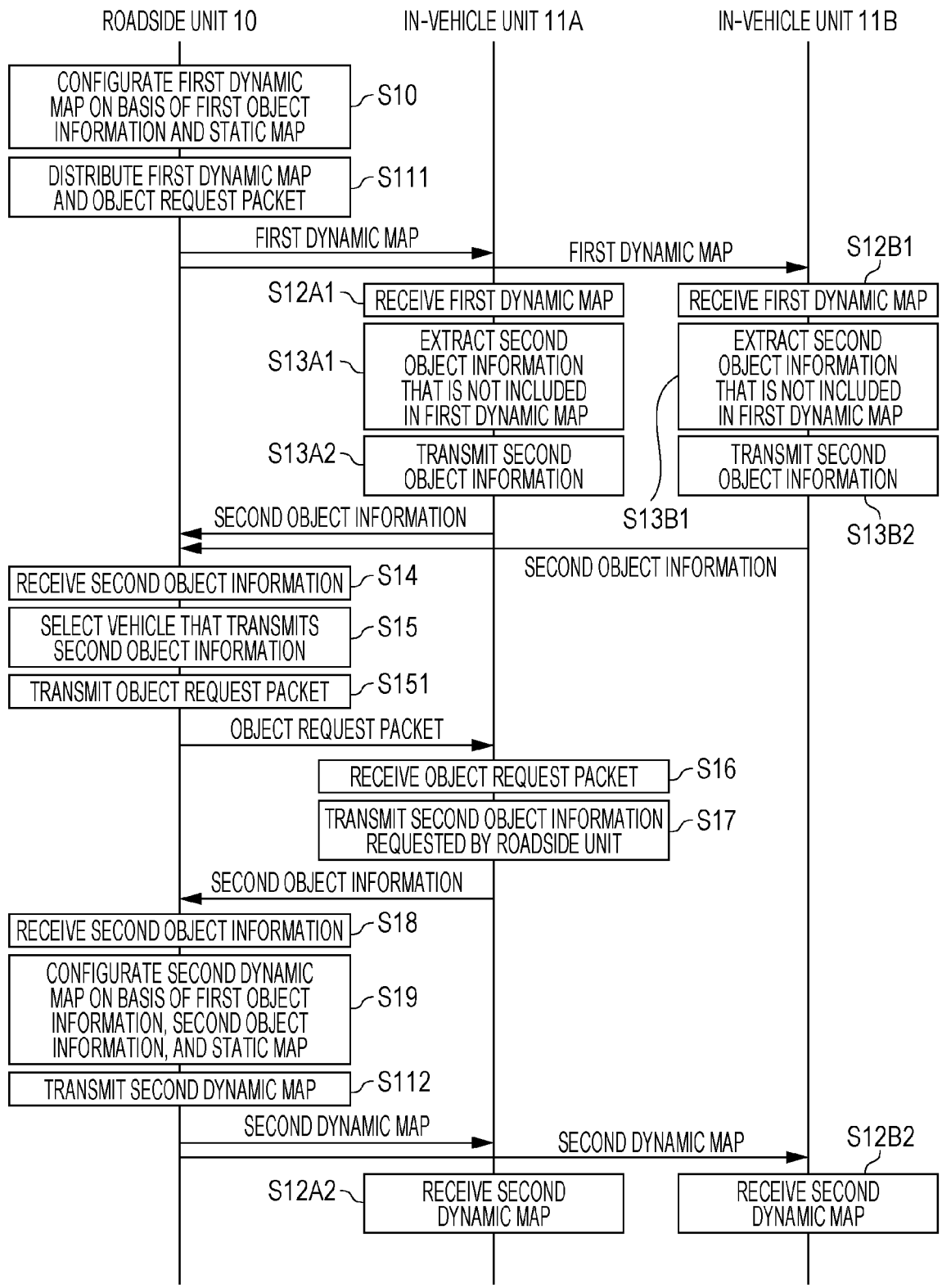
FIG. 11 is a sequence diagram illustrating an example of an operation of a communication system according to Embodiment 1.

FIG. 11 is a sequence diagram illustrating an example of an operation of the communication system 1 according to Embodiment 1. In FIG. 11, an example in which the in-vehicle unit 11A and the in-vehicle unit 11B are present is described. Furthermore, it is assumed that the in-vehicle unit 11A has second object information that is not included in a dynamic map held by the roadside unit 10. It is assumed that the in-vehicle unit 11B has only second object information that is included in a first dynamic map held by the roadside unit 10. In FIG. 11, for convenience of description, a dynamic map configurated before the roadside unit 10 receives second object information from the in-vehicle units 11 is referred to as a first dynamic map, and a dynamic map configurated after the roadside unit 10 receives second object information from the in-vehicle units 11 is referred to as a second dynamic map.

First, the dynamic map configurating unit 103 of the roadside unit 10 acquires sensing data observed by the sensor 107, calculates first object information from the sensing data, and configurates a first dynamic map on the basis of second object information managed in the object information management unit 1063 and a static map managed in the static map management unit 1062 (S10).

Next, the roadside unit 10 distributes the configurated first dynamic map to the in-vehicle unit 11A and the in-vehicle unit 11B (S111). The roadside unit 10 distributes the first dynamic map to the in-vehicle unit 11A and the in-vehicle unit 11B and distributes an object request packet to the in-vehicle unit 11A and the in-vehicle unit 11B. That is, the roadside unit 10 transmits the first dynamic map and the object request packet to the in-vehicle unit 11A and the in-vehicle unit 11B by broadcasting.

Next, when the in-vehicle unit 11A receives the first dynamic map (S12A1), the dynamic map configurating unit 112 reconfigures the first dynamic map by unifying the received first dynamic map and second object information managed in the object information management unit 1162, i.e., second object information calculated by the object information generating unit 115 on the basis of sensing data observed by the sensor 117. The dynamic map configurating unit 112 causes the reconfigured first dynamic map to be stored in the dynamic map management unit 1161.

Next, the in-vehicle unit 11A extracts second object information that is managed in the object information management unit 1162 and that is not included in first object information included in the received first dynamic map (S13A1).

Next, in a case where second object information that is not included in the first object information included in the first dynamic map received in Step S12A1 is managed in the object information management unit 1162, the in-vehicle unit 11A transmits the second object information that is not included in the first object information to the roadside unit 10. The in-vehicle unit 11A also transmits second object information stored in the object request management unit 1163 to the roadside unit 10 (S13A2).

In Steps S13A2 and S13B2, the in-vehicle units 11 may transmit all pieces of second object information sensed by the in-vehicle units 11 to the roadside unit 10.

The in-vehicle unit 11B also performs Step S12B1 of receiving the first dynamic map, Step S13B1 of extracting second object information, and Step S13B2 of transmitting the second object information as in the case of the in-vehicle unit 11A. The processes in Step S12B1, Step S13B1, and Step S13B2 are similar to those in Step S12A1, Step S13A1, and Step S13A2, and therefore description thereof is omitted.

Next, when the roadside unit 10 receives the second object information (S14), the roadside unit 10 causes the received second object information to be stored in the object information management unit 1063. Step S14 may be an example of a receiving step.

Next, the roadside unit 10 selects an in-vehicle unit 11 that transmits second object information to the roadside unit 10 (S15). Step S15 is an example of a vehicle selecting step.

Next, the roadside unit 10 transmits an object request packet to the selected in-vehicle unit 11 (S15). In this flow, it is assumed that the roadside unit 10 selects the in-vehicle unit 11A and transmits an object request packet to the selected in-vehicle unit 11A. That is, the roadside unit 10 transmits the object request packet to the in-vehicle unit 11A by unicasting (S151). Step S151 is an example of a requesting step.

Next, when the in-vehicle unit 11A receives the object request packet (S16), the in-vehicle unit 11A updates the object request management unit 1163 on the basis of information described in the received object request packet. That is, the in-vehicle unit 11B does not receive the object request packet and therefore does not transmit second object information to the roadside unit 10.

Furthermore, the in-vehicle unit 11A transmits second object information that is not included in the first dynamic map to the roadside unit 10 in accordance with the received object request packet (S17). In a case where second object information that is not included in the first object information included in the received first dynamic map is managed in the object information management unit 1162, the in-vehicle unit 11A, which has received the object request packet, transmits the second object information that is not included in the first object information to the roadside unit 10. That is, the in-vehicle unit 11A transmits the second object information including the second object information stored in the object request management unit 1163 to the roadside unit 10.

Next, when the roadside unit 10 receives the second object information that is not included in the first dynamic map (S18), the roadside unit 10 causes the received second object information to be stored in the object information management unit 1063. Step S18 is an example of a receiving step.

It is assumed here that the received first dynamic map includes all pieces of second object information managed in the object information management unit 1162 and that the second object information is not transmitted.

A timing at which the in-vehicle unit 11A transmits the second object information stored in the object request management unit 1163 may be a timing at which the object information generating unit 115 updates the object information management unit 1162.

Next, the sensor 107 generates sensing data by sensing surroundings of the roadside unit 10 (an example of a data acquiring step) and supplies the sensing data to the dynamic map configurating unit 103 of the roadside unit 10. The dynamic map configurating unit 103 calculates first object information from the sensing data of the surroundings observed by the sensor 107 and configurates a second dynamic map by using the calculated first object information, the second object information managed in the object information management unit 1063 in Step S14, and the static map stored in the static map management unit 1062 (S19) as in Step S10. Step S17 is an example of a configurating step.

Next, the roadside unit 10 transmits the configured second dynamic map to the in-vehicle units 11 (S112). Step S112 is an example of a transmitting step.

Next, when the in-vehicle unit 11A receives the second dynamic map (S12A2), the dynamic map configurating unit 112 reconfigures the second dynamic map on the basis of the received second dynamic map and the second object information stored in the object information management unit 1162. The dynamic map configurating unit 112 causes the reconfigured second dynamic map to be stored in the dynamic map management unit 1161. The dynamic map configurating unit 112 may overwrite the first dynamic map with the received second dynamic map or may overwrite the first dynamic map with the reconfigured second dynamic map.

When the in-vehicle unit 11B receives the second dynamic map (S12B2), the dynamic map configurating unit 112 reconfigures the second dynamic map on the basis of the received second dynamic map and the second object information stored in the object information management unit 1162. The dynamic map configurating unit 112 causes the reconfigured second dynamic map to be stored in the dynamic map management unit 1161. The dynamic map configurating unit 112 may overwrite the first dynamic map with the received second dynamic map or may overwrite the first dynamic map with the reconfigured second dynamic map. Hereinafter, a process similar to Step S14 is repeated until there is no vehicle to be selected.

In such a communication system 1, the roadside unit 10 transmits a first dynamic map held by the roadside unit 10 to the in-vehicle units 11, the in-vehicle units 11 extract second object information that is not included in the first dynamic map and transmit the second object information that is not included in the first dynamic map to the roadside unit 10. The roadside unit 10 receives the second object information that is not included in the first dynamic map from the in-vehicle units 11 and configures a new second dynamic map. The roadside unit 10 transmits the configured second dynamic map to the in-vehicle units 11. The in-vehicle units 11 can acquire a new second dynamic map by repeating processes such as extraction of second object information that is not included in the configured second dynamic map.

Operation of Roadside Unit

Next, an operation of the roadside unit 10 according to Embodiment 1 is described.

Figure 12:
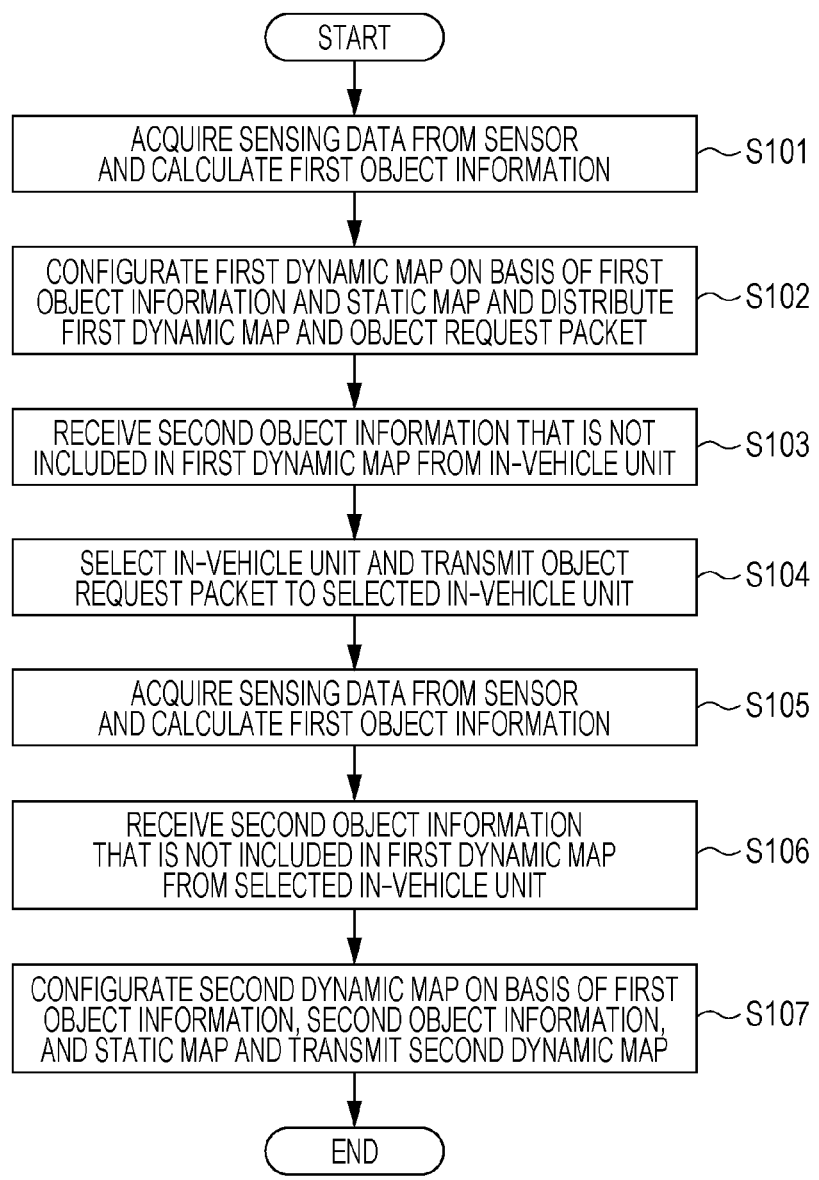
FIG. 12 is a flowchart illustrating an example of an operation of a roadside unit according to Embodiment 1.

FIG. 12 is a flowchart illustrating an example of an operation of the roadside unit 10 according to Embodiment 1. In FIG. 12, for convenience of description, a dynamic map configured before the roadside unit 10 receives second object information from the in-vehicle unit 11 is referred to as a first dynamic map, and a dynamic map configured after the roadside unit 10 receives second object information from the in-vehicle unit 11 is referred to as a second dynamic map. The first dynamic map may be an example of a dynamic map.

In FIG. 12, first, the roadside unit 10 acquires sensing data of the roadside unit 10 from the sensor 107, and the object information generating unit 115 calculates first object information on the basis of the sensing data (S101), as described above. The dynamic map configurating unit 103 calculates first object information from the sensing data. The dynamic map configurating unit 103 configurates a first dynamic map on the basis of the first object information and a static map and distributes the first dynamic map and an object request packet to the in-vehicle units 11 (S102).

Next, the roadside unit 10 receives, from the in-vehicle unit 11, second object information that is not included in the first dynamic map since a specific object cannot be observed by the sensor 107 (S103). The roadside unit 10 causes the second object information that is not included in the first dynamic map and transmission source information concerning the in-vehicle unit 11 that has transmitted this second object information to be stored in the object information management unit 1063 in association with each other.

Next, the roadside unit 10 selects an in-vehicle unit 11 that transmits second object information to the roadside unit 10 on the basis of the second object information and the transmission source information concerning the in-vehicle unit 11 that has transmitted the second object information that are stored in the object information management unit 1063. Then, the roadside unit 10 transmits an object request packet to the selected in-vehicle unit 11 (S104).

Next, the roadside unit 10 acquires sensing data of surroundings of the roadside unit 10 from the sensor 107 (S105) as in Step S101.

Next, the roadside unit 10 receives second object information from the selected in-vehicle unit 11 (S106).

Next, the roadside unit 10 configurates a second dynamic map on the basis of first object information based on the sensing data, the second object information managed in the object information management unit 1063 in Step S103, and the static map stored in the static map management unit 1062 and transmits the configured second dynamic map to the in-vehicle unit 11 (S107). Hereinafter, a process similar to Step S104 is repeated until there is no vehicle to be selected. The second dynamic map is an example of a dynamic map.

Details of the vehicle selecting process is described below with reference to FIG. 13.

Figure 13:
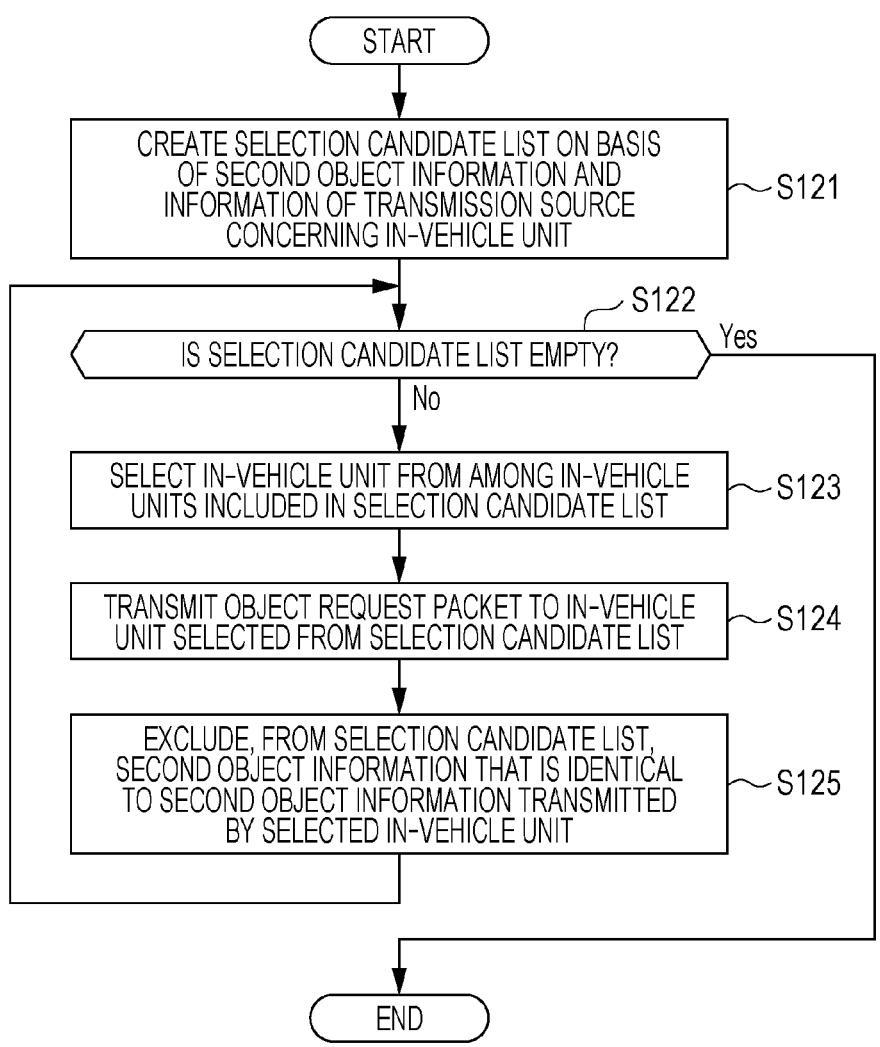
FIG. 13 is a flowchart illustrating an example of a detailed operation of a vehicle selecting process illustrated in FIG. 12.

FIG. 13 is a flowchart illustrating an example of a detailed operation of the vehicle selecting process illustrated in FIG. 12.

In the vehicle selecting process illustrated in FIG. 13, first, the selecting unit 104 of the roadside unit 10 acquires, from the object information management unit 1063, second object information and transmission source information concerning the in-vehicle units 11 that have transmitted the second object information and creates a selection candidate list in which the second object information and the transmission source information concerning the in-vehicle units 11 that are managed in the object information management unit 1063 are associated with each other (S121).

Next, the vehicle selecting unit 1041 checks whether or not the created selection candidate list is empty (S122).

In a case where the selection candidate list is empty (Yes in S122), the vehicle selecting unit 1041 finishes the vehicle selecting process.

Meanwhile, in a case where the selection candidate list is not empty (No in S122), the vehicle selecting unit 1041 selects an in-vehicle unit 11 from among the in-vehicle units 11 included in the selection candidate list (S123). A specific method for selecting an in-vehicle unit 11 has been described above. For example, the vehicle selecting unit 1041 selects an in-vehicle unit 11 that has transmitted the largest number of pieces of second object information to the roadside unit 10.

Next, the object information requesting unit 1042 transmits an object request packet to the in-vehicle unit 11 selected from the selection candidate list by the vehicle selecting unit 1041 (S124).

Next, the vehicle selecting unit 1041 excludes, from the selection candidate list, second object information that is identical to the second object information transmitted by the in-vehicle unit 11 selected in Step S124 (S125), as described above with reference to FIG. 10. Then, the vehicle selecting unit 1041 returns to the process in Step S122, and this process is repeated until a result of the process in Step S122 becomes Yes.

Effects and Other Remarks

Next, effects of the communication method, the roadside unit 10, and the communication system 1 according to the present embodiment are described.

As described above, in the communication method according to an aspect of the present disclosure, in the vehicle selecting step, at least one in-vehicle unit 11 is selected from among a plurality of in-vehicle units 11 on the basis of a list in which second object information and in-vehicle units 11 having the second object information are associated with each other. In the configurating step, a dynamic map is configured on the basis of first object information acquired in the data acquiring step, second object information acquired from the selected in-vehicle unit 11, and a static map indicative of a static object. In the transmitting step, the configured dynamic map is transmitted to one or more in-vehicle units 11. In this way, the roadside unit 10 can acquire second object information that cannot be observed by the roadside unit 10 while avoiding reception of duplicate second object information, and the in-vehicle unit 11 can use a dynamic map thus configured.

Furthermore, since the roadside unit 10 selects an in-vehicle unit 11 so that the number of in-vehicle units 11 that transmit second object information to the roadside unit 10 becomes small, a communication period in the whole in-vehicle units 11 can be shortened. This allows the roadside unit 10 to efficiently collect second object information necessary for creation of a dynamic map from the in-vehicle units 11. This can make shortage of a network band between the roadside unit 10 and the in-vehicle units 11 less likely.

It is therefore possible to efficiently collect data necessary for creation of a dynamic map and thereby make shortage of a network band less likely.

In particular, since data necessary for creation of a dynamic map is efficiently collected, failure of upload of information from the in-vehicle units 11 to the roadside unit 10 because of shortage of a network band between the roadside unit 10 and the in-vehicle units 11 can be made less likely. This achieves stable communication.

The roadside unit 10 according to the aspect of the present disclosure and the communication system 1 according to the aspect of the present disclosure also produce effects similar to the aforementioned effects.

According to the communication method according to the aspect of the present disclosure, in the configurating step, a dynamic map is configured on the basis of first object information acquired in the data acquiring step, second object information that is acquired from the in-vehicle unit 11 selected in the vehicle selecting step and indicates a dynamic object that is not included in a dynamic map, and a static map. The roadside unit 10 acquires second object information including a surrounding situation that is hard to observe by the roadside unit 10 and therefore can superimpose the second object information that is not included in the dynamic map onto the dynamic map. The in-vehicle unit 11 can more accurately grasp a surrounding situation by using the dynamic map thus configured.

According to the communication method according to the aspect of the present disclosure, in the receiving step, the roadside unit 10 receives second object information from each of one or more in-vehicle units 11. Since second object information can be acquired from an in-vehicle unit 11 selected in the vehicle selecting step, it is unnecessary to acquire second object information from all of the in-vehicle units 11. This can make shortage of a network band between the roadside unit 10 and the in-vehicle units 11 less likely.

Furthermore, according to the communication method according to the aspect of the present disclosure, an in-vehicle unit 11 that is a target of the first selection among a plurality of in-vehicle units 11 included in the list is excluded from the list. Furthermore, an in-vehicle unit 11 that is a target of the second selection is excluded from the list. In this way, the list is updated. Since the in-vehicle unit 11 that is a target of the first selection and the in-vehicle unit 11 that is a target of the second selection are excluded from the list, it is possible to decrease the number of in-vehicle units 11 to be selected. Since the number of in-vehicle units 11 that communicate with the roadside unit 10 decreases, it is possible to decrease an amount of communication between the roadside unit 10 and the in-vehicle units 11.

Embodiment 2

Embodiment 2 is described below.

The present embodiment is different from Embodiment 1 in that second object information according to area information is used. A communication method, a roadside unit 20, and a communication system 1 according to the present embodiment are similar to those in Embodiment 1 unless otherwise specified, and constituent elements that are identical to those in Embodiment 1 are given identical reference signs, and detailed description thereof is omitted.

Configuration of Roadside Unit

Figure 14:
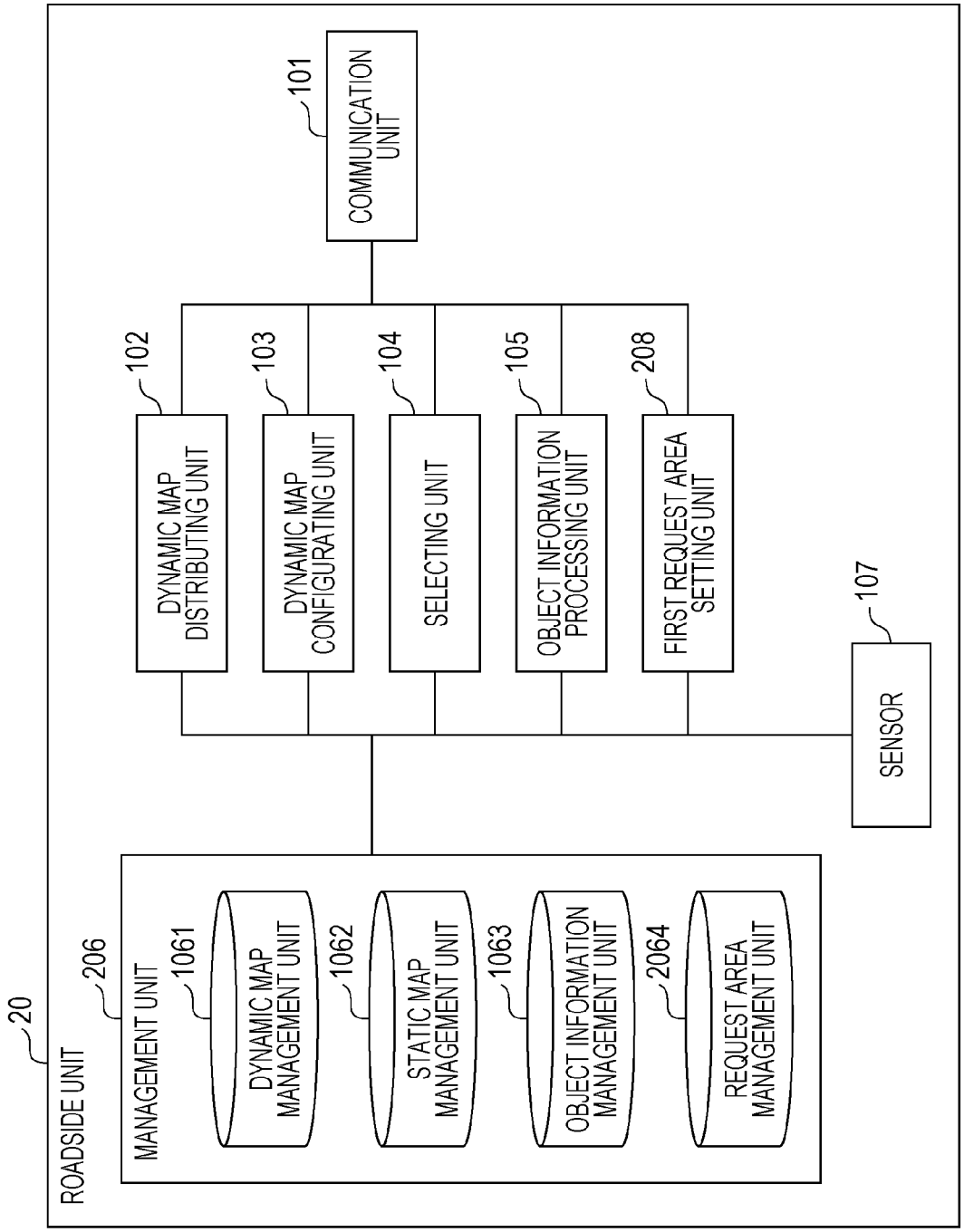
FIG. 14 is a diagram illustrating an example of a configuration of a roadside unit according to Embodiment 2.

FIG. 14 is a diagram illustrating an example of a configuration of the roadside unit 20 according to Embodiment 2.

As illustrated in FIG. 14, the roadside unit 20 according to the present embodiment further includes a first request area setting unit 208 in addition to the configuration of the roadside unit 10 according to Embodiment 1, and a management unit 206 further include a request area management unit 2064.

Request Area Management Unit

The request area management unit 2064 stores therein information indicative of a request area that is an area in which second object information is collected by the roadside unit 20. The information indicative of a request area includes information indicative of an area specified for in-vehicle units 21 and a sensor 107 in advance around the roadside unit 20 by the roadside unit 20 and object information (first object information and second object information) concerning an object present within the specified area.

Figures 15, 16:
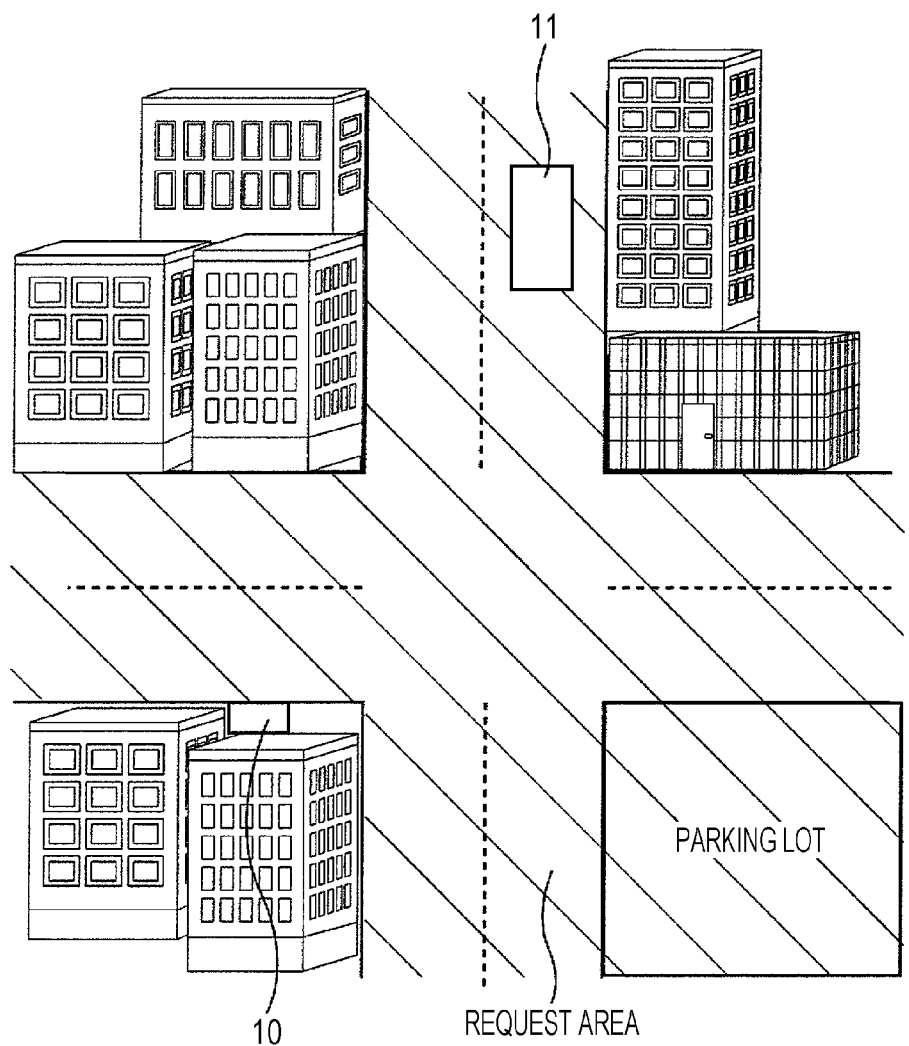
FIG. 15 illustrates an example of area information according to Embodiment 2.
FIG. 16 is a schematic view illustrating a request area according to Embodiment 2.

The request area may be determined in advance by an administrator of the roadside unit 20 or may be calculated on the basis of the sensor 107 and a static map by the roadside unit 20 (see FIG. 16). FIG. 16 is a schematic view illustrating a request area according to Embodiment 2. In FIG. 16, the request area is indicated by the diagonal lines.

For example, in a case where an area that has influence on running of a vehicle is set in advance as the request area, necessity of determining whether or not second object information that is not included in a dynamic map is present is low in an area, such as a building, where information on an object is unnecessary. In a case where a request area in which second object information is necessary is set in advance, it is unnecessary to receive second object information in an unnecessary area. Meanwhile, a parking lot may be included in the request area because a vehicle sometimes leaves the parking lot. As described above, for example, in an area that does not have large influence on running of a vehicle, an in-vehicle unit 21 need not calculate second object information that is not included in a dynamic map, and the roadside unit 20 need not receive second object information that is not included in the dynamic map outside the request area.

The first request area setting unit 208 transmits the request area stored in the request area management unit 2064 to the in-vehicle units 21 through a communication unit 101. More specifically, the request area management unit 2064 transmits a packet indicative of the request area illustrated in FIG. 15. The packet indicative of the request area includes, as an area identifier, an identifier by which the request area can be uniquely identified on a map if any and includes a group of vertexes surrounding the area. That is, the area identifier is an identifier allocated to each area, and the group of vertexes of the area is a group of vertexes that specify the area by surrounding the area.

Configuration of In-Vehicle Unit

Figure 17:
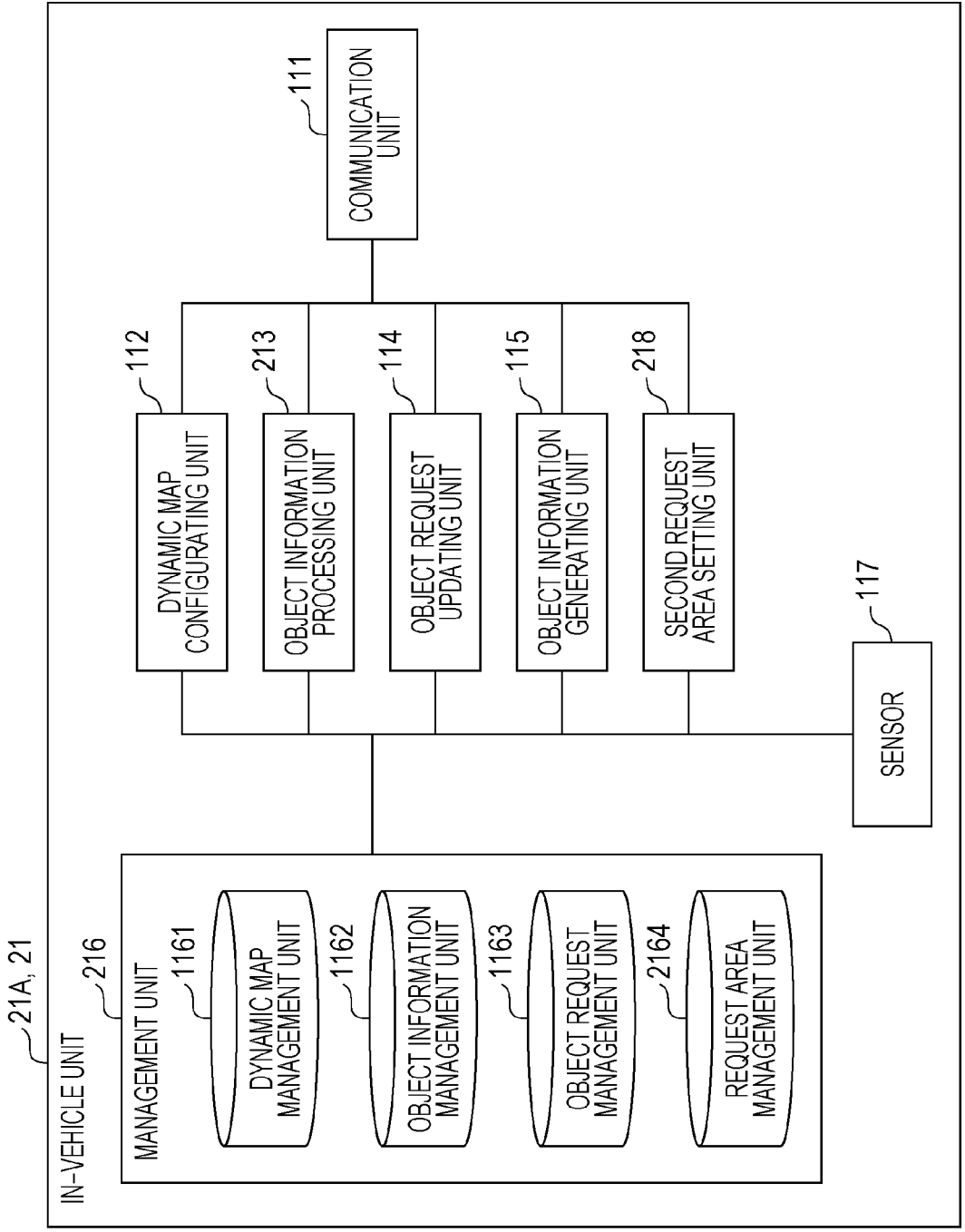
FIG. 17 is a diagram illustrating an example of a functional configuration of an in-vehicle unit according to Embodiment 2.

FIG. 17 is a diagram illustrating an example of a configuration of the in-vehicle unit 21 according to Embodiment 2. In FIG. 17, constituent elements that are similar to those in the in-vehicle unit 11 of Embodiment 1 are given identical reference signs, and detailed description thereof is omitted.

The in-vehicle unit 21 illustrated in FIG. 17 is different from the in-vehicle unit 11 according to Embodiment 1 in terms of a management unit 216 and an object information processing unit 213. The management unit 216 includes a request area management unit 2164. The in-vehicle unit 21 includes a second request area setting unit 218.

Upon receipt of a packet of a request area illustrated in FIG. 15, the second request area setting unit 218 causes information indicative of the received request area to be stored in the request area management unit 2164.

The request area management unit 2164 stores therein information concerning an area where the roadside unit 20 collects second object information. The information indicative of the request area may be determined in advance by an administrator of the roadside unit 20 or may be calculated on the basis of the sensor 107 and a static map by the roadside unit 20.

Object Information Processing Unit

Upon receipt of a dynamic map from the roadside unit 20 through a communication unit 111, the object information processing unit 213 receives second object information corresponding to an object identifier managed in an object request management unit 1163 from an object information management unit 1162. The object information processing unit 213 checks whether or not an object is present within the request area managed in the request area management unit 2164. In a case where an object is present within the request area, the object information processing unit 213 compares first object information included in the received dynamic map and second object information concerning an object present within the request area that is stored in the object information management unit 1162. The object information processing unit 213 transmits second object information that is present within the request area and that is not included in the dynamic map to the roadside unit 20.

Overall Operation of Communication System

Next, an operation of the communication system 1 configured as above is described with reference to FIG. 17.

Figure 18:
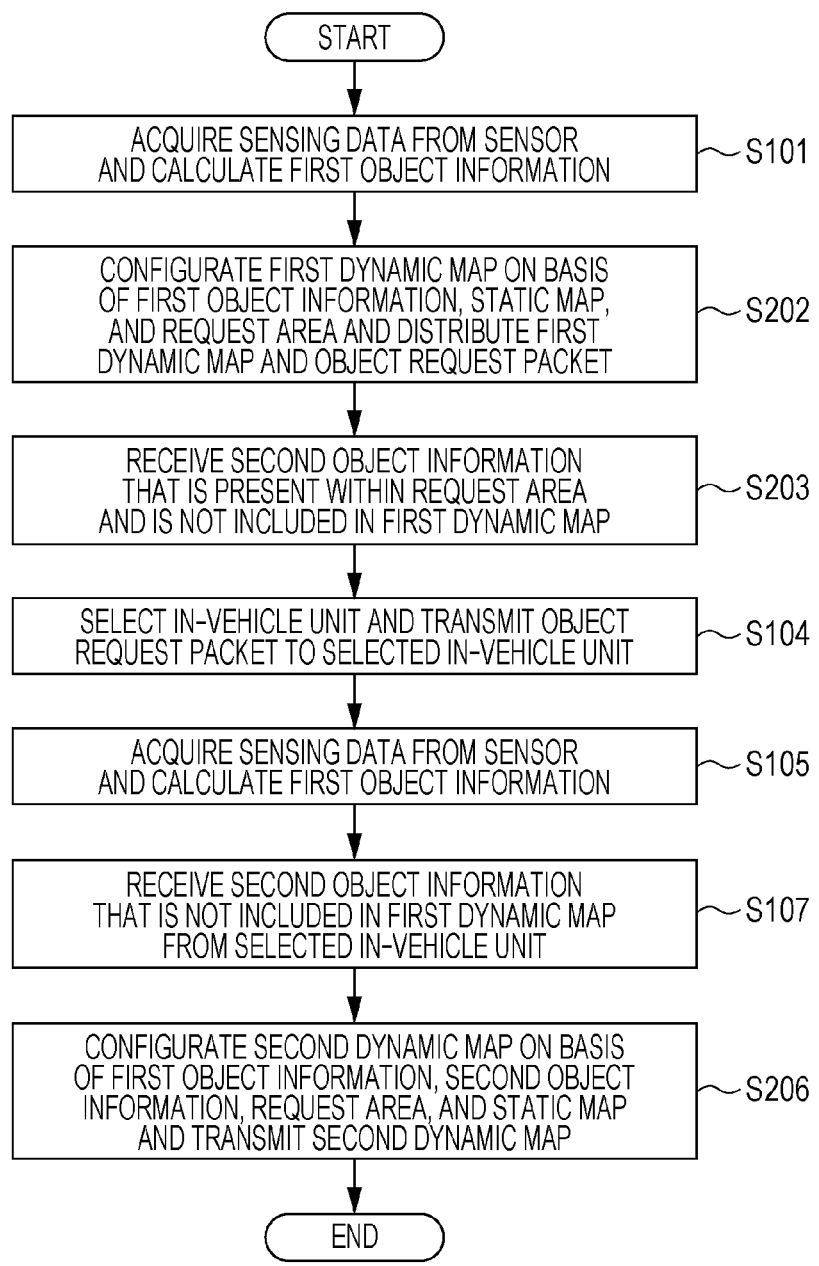
FIG. 18 is a flowchart illustrating an example of an operation of a roadside unit according to Embodiment 2.

FIG. 18 is a flowchart illustrating an example of an operation of the roadside unit 20 according to Embodiment 2. The flow of FIG. 18 is similar to that of FIG. 12 of Embodiment 1, and description of similar processes is omitted as appropriate. In FIG. 18, for convenience of description, a dynamic map configured before the roadside unit 20 receives second object information from the in-vehicle units 21 is referred to as a first dynamic map, and a dynamic map configured after the roadside unit 20 receives second object information from the in-vehicle units 21 is referred to as a second dynamic map.

As illustrated in FIG. 18, the roadside unit 20 acquires sensing data of the roadside unit 20 from the sensor 107, and a dynamic map configurating unit 103 calculates the first object information from the sensing data (S101), as described above. The dynamic map configurating unit 103 configurates a first dynamic map on the basis of the first object information, a static map, and a request area. Furthermore, the dynamic map configurating unit 103 distributes the first dynamic map, information indicative of the request area stored in the request area management unit 2064, and an object request packet to the in-vehicle units 21 (S202).

Next, the roadside unit 20 receives, from the in-vehicle units 21, second object information that is present within the request area and that is not included in the first dynamic map since a specific object cannot be observed by the sensor 107 (Step S203). Step S203 is an example of a step of receiving second dynamic information present within an area.

Next, the roadside unit 20 selects an in-vehicle unit 21 that transmits second object information to the roadside unit 20 on the basis of the second object information stored in an object information management unit 1063 and transmission source information concerning the in-vehicle units 21 that have transmitted the second object information. Then, the roadside unit 20 transmits an object request packet to the selected in-vehicle unit 21 (S104).

Next, the roadside unit 20 acquires sensing data of surroundings of the roadside unit 20 from the sensor 107, and the dynamic map configurating unit 103 calculates first object information from this sensing data (S105) as in Step S101.

Next, the roadside unit 20 configurates a second dynamic map on the basis of first object information based on the sensing data, the second object information managed in the object information management unit 1063 in Step S203, the information indicative of the request area managed in the request area management unit 2064, and the static map stored in a static map management unit 1062 and transmits the configurated second dynamic map to the in-vehicle units 21 (S206).

Next, the roadside unit 20 receives second object information from the selected in-vehicle unit 21 (S107). Hereinafter, a process similar to Step S104 is repeated until there is no in-vehicle unit 11 to be selected.

Effects and Other Remarks

Next, effects of the communication method, the roadside unit 20, and the communication system 1 according to the present embodiment are described below.

As described above, in the communication method according to the aspect of the present disclosure, second object information that is present within a request area set in advance on a static map is received in the extracting step. By setting in advance a request area in which second object information is needed, it becomes unnecessary to receive second object information in an unnecessary area. That is, the roadside unit 20 can keep an amount of communication of second object information received from the in-vehicle units 21 small since the request area in which second object information is needed is limited. Since the number of in-vehicle units 21 that communicate with the roadside unit 20 decreases, it is possible to decrease an amount of communication between the roadside unit 20 and the in-vehicle units 21. It is therefore possible to efficiently collect data necessary for the roadside unit 20 to create a dynamic map and make shortage of a network band less likely.

In this way, the roadside unit 20 can achieve stable communication while making shortage of a network resource less likely and can acquire necessary second object information with certainty.

Other Modifications

A communication method, a roadside unit, and a communication system according to one or more aspects of the present disclosure have been described above, but the present disclosure is not limited to Embodiments 1 and 2. Various modifications of Embodiments 1 and 2 that a person skilled in the art can think of and combinations of constituent elements in different embodiments are also encompassed within the scope of the one or more aspects of the present disclosure without departing from the spirit of the present disclosure. For examples, the following cases are also encompassed in the present disclosure.

For example, in the communication methods, the roadside units, and the communication systems according to Embodiments 1 and 2, sensing data cannot be transmitted to a roadside unit side if sensing data cannot be sensed by an in-vehicle unit. In this case, since it is presumed that a blind spot of the roadside unit changes after elapse of a predetermined period, the roadside unit may reset a configurated dynamic map after elapse of the predetermined period from a time at which the roadside unit fails to receive sensing data.

In the communication methods, the roadside units, and the communication systems according to Embodiments 1 and 2, a roadside unit directly selects at least one in-vehicle unit from among a plurality of in-vehicle units. However, the present disclosure is not limited to this. The roadside unit may indirectly select at least one in-vehicle unit from among a plurality of in-vehicle units through a server. That is, the plurality of in-vehicle units may transmit second object information to the server, and the roadside unit may select at least one in-vehicle unit from among the plurality of in-vehicle units stored in the server.

(1) Each of the apparatuses described above is a computer system that includes a microprocessor, a ROM, a RAM, a hard disk unit, a display unit, a keyboard, a mouse, and the like. A computer program is stored in the RAM or the hard disk unit. The microprocessor operates in accordance with the computer program, and thus each of the apparatuses accomplishes a function thereof. The computer program is a combination of a plurality of command codes indicating a command given to a computer for accomplishment of a predetermined function.

(2) Part of or all of constituent elements that constitute each of the apparatuses may include a single system large scale integration (LSI). The system LSI is a super-multi-function LSI produced by integrating a plurality of constituents on a single chip and is specifically a computer system including a microprocessor, a ROM, a RAM, and the like. A computer program is stored in the RAM. The microprosor operates in accordance with the computer program, and thus the system LSI accomplishes a function thereof.

(3) Part of or all of constituent elements that constitute each of the apparatuses may include an IC card that can be detachably attached to the apparatus or a stand-alone module. The IC card or the module is a computer system that includes a microprocessor, a ROM, a RAM, and the like. The IC card or the module may include the super-multi-function LSI. The microprocessor operates in accordance with a computer program, and thus the IC card or the module accomplishes a function thereof. The IC card or the module may have tamper resistance.

(4) The present disclosure may be the methods described above. The present disclosure may be a computer program for causing a computer to realize these methods or may be a digital signal represented by the computer program.

The present disclosure may be a computer-readable recording medium, such as a flexible disc, a hard disk, a CD-ROM, an MO, a DVD, a DVD-ROM, a DVD-RAM, a BD (Blu-ray (Registered Trademark) Disc), or a semiconductor memory, on which the computer program or the digital signal is recorded. The present disclosure may be the digital signal recorded on such a recording medium.

The present disclosure may be the computer program or the digital signal transmitted over an electric communication line, a wireless or wired communication line, a network represented by the Internet, data broadcasting, or the like.

The present disclosure may be a computer system including a microprocessor and a memory, the memory storing the computer program, and the microprocessor operating in accordance with the computer program.

The program or the digital signal may be executed by another independent computer system by transporting the program or the digital signal on the recording medium or transporting the program or the digital signal over the network or the like.

(5) The above embodiments may be combined.

The present disclosure can be used for a communication method, a roadside unit, and a communication system, especially for a communication method, a roadside unit, and a communication system used to configurate a dynamic map for safe driving and automated driving.

What is claimed is:

1. A communication method performed by a roadside unit that is installed on a roadside and acquires first dynamic information indicative of a dynamic object around the roadside unit and second dynamic information indicative of a dynamic object around a plurality of in-vehicle units, the communication method comprising:
   selecting at least one in-vehicle unit from the plurality of in-vehicle units on a basis of a list in which the second dynamic information and the plurality of in-vehicle units having the second dynamic information are associated with each other;
   acquiring the first dynamic information indicative of a state around the roadside unit acquired by a sensor mounted in the roadside unit;
   configuring a dynamic map utilizing the acquired first dynamic information, the second dynamic information acquired from the selected at least one in-vehicle unit, and a static map indicative of a static object; and
   transmitting the dynamic map to one or more of the plurality of in-vehicle units that communicate with the roadside unit.

2. The communication method according to claim 1, further comprising requesting the selected at least one in-vehicle unit to transmit the second dynamic information to the roadside unit; and
   wherein, in the configuring, the dynamic map is configured on a basis of the acquired first dynamic information, second dynamic information acquired from the selected at least one in-vehicle unit and indicating a dynamic object that is not included in the dynamic map, and the static map.

3. The communication method according to claim 1, further comprising receiving the second dynamic information from each of the one or more of the plurality of in-vehicle units.

4. The communication method according to claim 1, wherein
   the selecting further includes:
   selecting a first in-vehicle unit that has transmitted a largest number of dynamic objects indicated by the second dynamic information from the plurality of in-vehicle units included in the list;
   excluding the first in-vehicle unit from the list;
   selecting a second in-vehicle unit that has transmitted the second dynamic information identical to the second dynamic information transmitted by the first in-vehicle unit; and
   updating the list by excluding the second in-vehicle unit from the list.

5. The communication method according to claim 1, further comprising
   receiving second dynamic information which is present within a predetermined area, the predetermined area being set on the static map in advance.

6. A roadside unit adjacent to a road, comprising:
   a sensor that acquires sensing data indicative of a state around the roadside unit;
   a communication circuit; and
   circuitry that, in operation, performs an operation including:
   configuring a dynamic map by superimposing first dynamic information on the road utilizing the sensing data onto a static map including the road,
   transmitting, through the communication circuit, the dynamic map to a plurality of in-vehicle units that communicate with the roadside unit,
   receiving, through the communication circuit, second dynamic information that is not included in the dynamic map from each of the plurality of in-vehicle units,
   selecting at least one in-vehicle unit from the plurality of in-vehicle units utilizing a list in which the received second dynamic information and the plurality of in-vehicle units that have transmitted the second dynamic information are associated with each other, and
   requesting the selected at least one in-vehicle unit to transmit the second dynamic information to the roadside unit.

7. A communication system comprising:
   a roadside unit adjacent to a road; and
   a plurality of in-vehicle units that are mounted in a plurality of vehicles and that transmit second dynamic information to the roadside unit,
   wherein the roadside unit includes:
   a sensor that acquires sensing data indicative of a state around the roadside unit;

a communication circuit; and circuitry that, in operation, performs an operation including:

configuring a dynamic map by superimposing first dynamic information on the road based on the sensing data onto a static map including the road, transmitting, through the communication circuit, the dynamic map to the plurality of in-vehicle units that communicate with the roadside unit, receiving, through the communication circuit, the second dynamic information that is not included in the dynamic map from each of the plurality of in-vehicle units, selecting at least one in-vehicle unit from the plurality of in-vehicle units utilizing a list in which the received second dynamic information and the plurality of in-vehicle units that have transmitted the second dynamic information are associated with each other, and requesting the selected at least one in-vehicle unit to transmit the second dynamic information to the roadside unit.

* * * * *